United States Patent
Maltsev et al.

(10) Patent No.: US 9,362,991 B2
(45) Date of Patent: *Jun. 7, 2016

(54) APPARATUS, SYSTEM AND METHOD OF TRANSMIT POWER CONTROL FOR WIRELESS COMMUNICATION

(71) Applicant: INTEL CORPORATION, Santa Clara, CA (US)

(72) Inventors: Alexander Maltsev, Nizhny Novgorod (RU); Ali S. Sadri, San Diego, CA (US); Andrey Pudeyev, Nizhny Novgorod (RU); Richard B. Nicholls, Banks, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/835,919

(22) Filed: Aug. 26, 2015

(65) Prior Publication Data

US 2015/0365908 A1    Dec. 17, 2015

Related U.S. Application Data

(63) Continuation of application No. 13/870,105, filed on Apr. 25, 2013.

(60) Provisional application No. 61/765,363, filed on Feb. 15, 2013.

(51) Int. Cl.
  *H04B 7/00*     (2006.01)
  *H04B 7/04*     (2006.01)
  (Continued)

(52) U.S. Cl.
  CPC .............. *H04B 7/0413* (2013.01); *H04B 7/043* (2013.01); *H04B 7/0426* (2013.01);
  (Continued)

(58) Field of Classification Search
  USPC .............. 455/522, 67.11, 68–70, 115.3, 126, 455/127.1, 127.2, 135, 226.3, 277.2, 296; 370/318
  See application file for complete search history.

(56) References Cited

U.S. PATENT DOCUMENTS

2004/0038713 A1*  2/2004  Okawa .................. H04W 16/28
                                                             455/561
2005/0110641 A1   5/2005  Mendolia et al.
(Continued)

FOREIGN PATENT DOCUMENTS

| EP | 2557861 | 2/2013 |
| RU | 2390934 | 5/2010 |
| WO | 2011100673 | 8/2011 |

OTHER PUBLICATIONS

Office Action for Australian Patent Application Serial No. 2014216655, mailed on Oct. 29, 2015, 3 pages.
(Continued)

*Primary Examiner* — Dominic Rego
(74) *Attorney, Agent, or Firm* — Schichrur & Co.

(57) ABSTRACT

Some demonstrative embodiments include apparatuses, systems and/or methods of transmit power control for wireless communication. For example, an apparatus may include a controller to control a plurality of transmit powers of a plurality of directional beams formed by an antenna array to transmit a wireless communication. The controller may control the plurality of transmit powers based on at least first and second power limits, the first power limit including a power density limit corresponding to a power density of a directional beam of the plurality of directional beams, and the second power limit including a total transmit power limit corresponding to a total of the transmit powers.

24 Claims, 9 Drawing Sheets

(51) Int. Cl.
    *H04W 52/26*     (2009.01)
    *H04W 52/36*     (2009.01)
    *H04B 7/06*      (2006.01)
    *H04W 52/42*     (2009.01)
    *H04W 52/14*     (2009.01)

(52) U.S. Cl.
    CPC .......... *H04B 7/0452* (2013.01); *H04B 7/0617* (2013.01); *H04W 52/14* (2013.01); *H04W 52/26* (2013.01); *H04W 52/267* (2013.01); *H04W 52/36* (2013.01); *H04W 52/367* (2013.01); *H04W 52/42* (2013.01); *H04W 52/143* (2013.01)

(56) References Cited

U.S. PATENT DOCUMENTS

| | | | |
|---|---|---|---|
| 2005/0159187 | A1 | 7/2005 | Mendolia et al. |
| 2005/0197149 | A1* | 9/2005 | Iacono ............ H04W 52/42 455/522 |
| 2006/0030350 | A1 | 2/2006 | Mitchell |
| 2006/0199604 | A1 | 9/2006 | Walton et al. |
| 2010/0033390 | A1 | 2/2010 | Alamouti et al. |
| 2010/0103900 | A1* | 4/2010 | Yeh ............ H04B 7/0695 370/330 |
| 2011/0136534 | A1 | 6/2011 | Nanba et al. |
| 2012/0045005 | A1 | 2/2012 | Kim et al. |
| 2013/0156120 | A1* | 6/2013 | Josiam ............ H04B 7/0697 375/260 |
| 2014/0094207 | A1 | 4/2014 | Amizur et al. |
| 2014/0235287 | A1 | 8/2014 | Maltsev et al. |

OTHER PUBLICATIONS

WiGig MAC and PHY Specification; Version 1.1; Apr. 2011—Final Specification, 442 pages.

IEEE Std 802.11™-2012 (Revision of IEEE Std 802.11-2007), IEEE Standard for Information technology—Telecommunications and information exchange between systems Local and metropolitan area networks—Specific requirements, Part 11: Wireless LAN Medium Access Control (MAC) and Physical Layer (PHY) Specifications, IEEE Computer Society, Mar. 29, 2012, 2793 pages.

IEEE Std 802.11ad™-2012 (Amendment to IEEE Std 802.11™-2012, as amended by IEEE Std 802.11ae™-2012 and IEEE Std 802.11aa™-2012), IEEE Standard for Information technology—Telecommunications and information exchange between systems, Local and metropolitan area networks—Specific requirements, Part 11: Wireless LAN Medium Access Control (MAC) and Physical Layer (PHY) Specifications, Amendment 3: Enhancements for Very High Throughput in the 60 GHz Band, IEEE Computer Society, Dec. 28, 2012, 628 pages.

Robert F. Cleveland, Jr., David M. Sylvar, Jerry L. Ulcek, Federal Communications Commission—Office of Engineering & Technology, Evaluating Compliance with FCC Guidelines for Human Exposure to Radiofrequency Electromagnetic Fields OET Bulletin 65—Edition 97-01, Aug. 1997, 84 pages.

International Search Report and Written opinion for International Patent Application No. PCT/US2014/015015, mailed on May 23, 2014, 13 pages.

Office Action for U.S. Appl. No. 13/870,105, mailed on Feb. 17, 2015, 15 pages.

International Preliminary Report on Patentability and Written Opinion for International Patent Application No. PCT/US2014/015015, mailed on Aug. 27, 2015, 10 pages.

Office Action for Russian Patent Application Serial No. 2015128852/07, mailed on Feb. 2, 2016, 11 pages, including 3 pages of English translation.

* cited by examiner

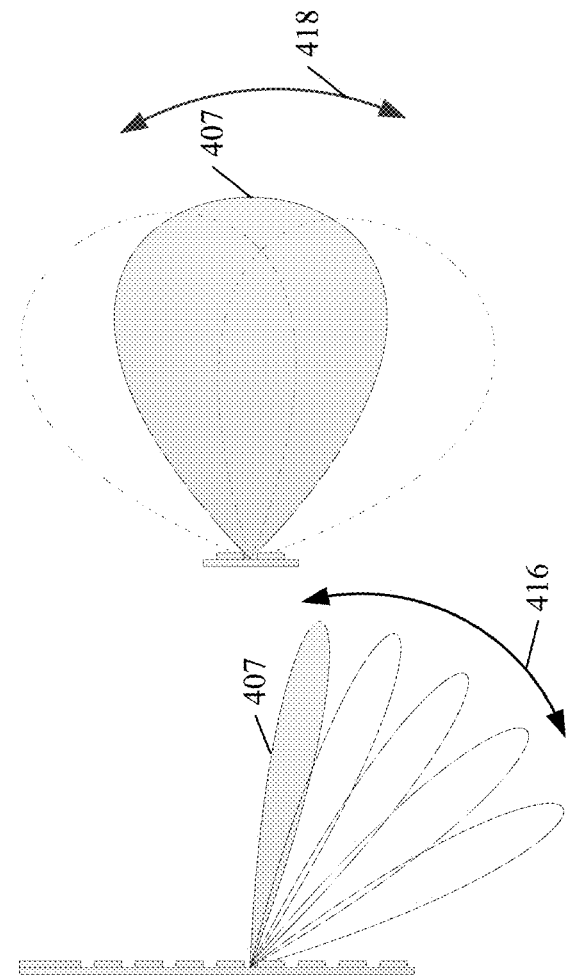
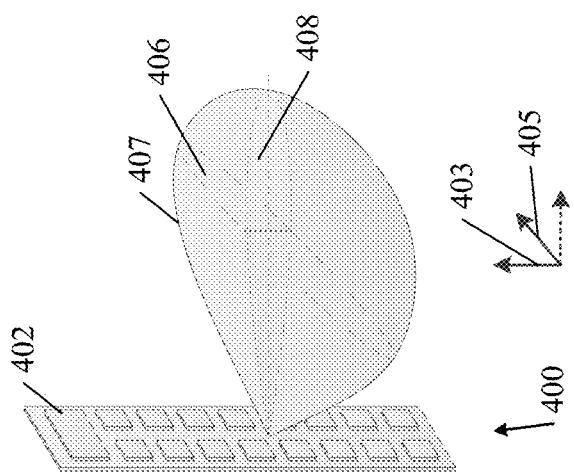
Fig. 4A
Fig. 4B
Fig. 4C

APPARATUS, SYSTEM AND METHOD OF TRANSMIT POWER CONTROL FOR WIRELESS COMMUNICATION

CROSS REFERENCE

This Application is a Continuation Application of U.S. patent application Ser. No. 13/870,105, filed on Apr. 25, 2013, which claims the benefit of and priority from U.S. Provisional Patent Application No. 61/765,363 entitled "Intelligent Transmit Power Control for mmWave MU-MIMO Systems with Power Density Limitations", filed Feb. 15, 2013, the entire disclosures of which are incorporated herein by reference.

TECHNICAL FIELD

Embodiments described herein generally relate to wireless communication.

BACKGROUND

Electronic devices, (e.g., laptops, tablets, notebooks, netbooks, personal digital assistants (PDAs), personal computers, mobile phones, etc.) often include a variety of wireless communication capabilities. Such capabilities may involve communications in higher frequency ranges of the communication spectrum, such as in the millimeter wave (mmWave) region, e.g., the 60 Gigahertz (GHz) frequency band. These higher frequency ranges can advantageously offer higher data rates.

A mmWave propagation has a few major distinctive features in comparison with lower frequency bands, e.g., the frequency bands of 2.4-5 GHz. For example, the mmWave propagation may have a propagation loss greater than the propagation loss in the lower frequency bands, and may have Quasi-optical propagation properties.

A mmWave communication system may use high-gain directional antennas to compensate for large path loss and/or employ beam-steering techniques. Design of appropriate antenna system and/or further signal processing may be an important aspect of mmWave communication system development.

Multi-element phased antenna arrays may be used, for example, for creation of a directional antenna pattern. A phased antenna array may form a directive antenna pattern or a beam, which may be steered by setting appropriate signal phases at the antenna elements.

Various regulations and limitations, e.g., government regulations and limitations, may apply to transmissions performed over one or more frequency bands. For example, the United States Federal Communications Commission (FCC) imposes a peak emission limit of a maximum power density of $S_{max}=18$ μW/cm$^2$ for a millimeter-wave band, e.g., the frequency band of 59.05-64 GHz, as measured three meters from the transmit antenna, and a total transmitted power limit $P_{max}=500$ mW. Similar limitations exist in regulations of other countries and/or for other frequency bands.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
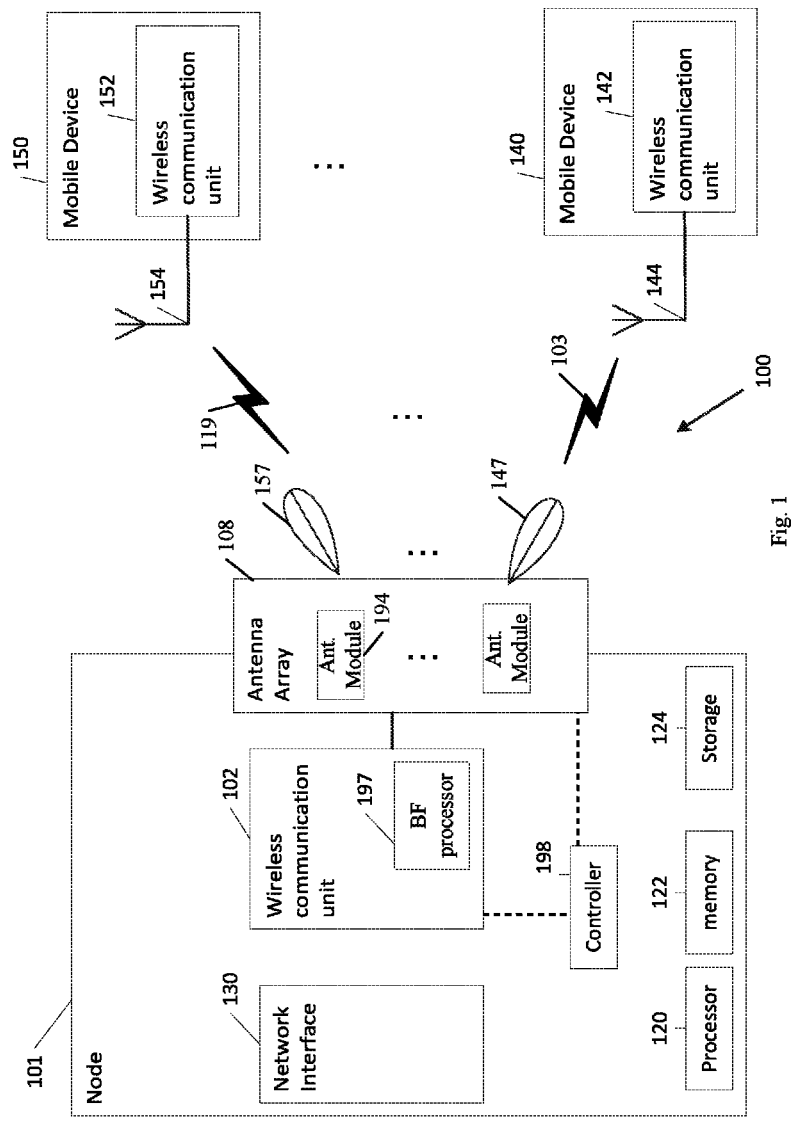
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version 1.1, April* 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless lAN Medium Access Control (MAC) and Physical Layer (PHY) Specifications, Mar.* 29, 2012; *IEEE*802.11 task group ac (*TGac*) ("*IEEE*802.11-09/0308r12—*TGac Channel Model Addendum Document*"); IEEE 802.11 task group ad (*TGad*) (*IEEE P802.11ad Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 3: *Enhancements for Very High Throughput in the* 60 *GHz Band*)) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 Gigahertz (GHz). However, other embodiments may be implemented utilizing any other suitable wireless communication frequency bands, for example, an Extremely High Frequency (EHF) band (the millimeter wave (mmwave) frequency band), e.g., a frequency band within the frequency band of between 20 Ghz and 300 GHZ, a WLAN frequency band, a WPAN frequency band, a frequency band according to the WGA specification, and the like.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a station-to-station (STA-to-STA) communication in an independent basic service set (IBSS), or the like.

The term "antenna", as used herein, may include any suitable configuration, structure and/or arrangement of one or more antenna elements, components, units, assemblies and/ or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "mmWave frequency band" as used herein may relate to a frequency band above 20 GHz, e.g., a frequency band between 20 GHz and 300 GHz.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the mmWave or DMG band.

The term "beamforming", as used herein, may relate to a spatial filtering mechanism, which may be used at a transmitter and/or a receiver to improve one or more attributes, e.g., the received signal power or signal-to-noise ratio (SNR) at an intended receiver.

The term "cell", as used herein, may include a combination of network resources, for example, downlink and optionally uplink resources. The resources may be controlled and/or allocated, for example, by a wireless communication node (also referred to as a "node" or a "base station"), or the like. The linking between a carrier frequency of the downlink resources and a carrier frequency of the uplink resources may be indicated in system information transmitted on the downlink resources.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via a wireless medium (WM). For example, system 100 may include one or more wireless communication nodes, e.g., including a node 101, and one or more mobile devices, e.g., including mobile devices 140 and 150. The wireless medium may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, node 101, mobile device 150 and mobile device 140 may form and/or communicate as part of one or more wireless communication networks. For example, node 101 and mobile devices 140 and 150 may form and/or may communicate as part of a wireless communication cell, e.g., as described below.

In some demonstrative embodiments, node 101 may include or may perform the functionality of a Base Station (BS), a macro BS, a micro BS, an Access Point (AP), a WiFi node, a Wimax node, a cellular node, e.g., an Evolved Node B (eNB), an LTE node, a station, a hot spot, a network controller, and the like.

In some demonstrative embodiments, mobile devices 140 and/or 150 may include, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, node 101, mobile device 150 and/or mobile device 140 may include one or more wireless communication units to perform wireless communication between node 101, mobile device 150 and/or mobile device 140 and/or with one or more other wireless communication devices, e.g., as described below. For example, node 101 may include a wireless communication unit 102, mobile device 150 may include a wireless communication unit 152 and/or mobile device 140 may include a wireless communication unit 142.

In some demonstrative embodiments, wireless communication units 102, 152 and 142 may include, or may be associated with, one or more antennas. In one example, wireless communication unit 102 may be associated with at least one antenna array 108; wireless communicate unit 152 may be associated with one or more antennas 154; and/or wireless communication unit 142 may be associated with one or more antennas 144.

Antennas 108, 154 and/or 144 may include any type of antennas suitable for transmitting and/or receiving wireless communication signals, blocks, frames, transmission streams, packets, messages and/or data. For example, antennas 108, 154 and/or 144 may include any suitable configuration, structure and/or arrangement of one or more antenna elements, components, units, assemblies and/or arrays. Antennas 108, 154 and/or 144 may include, for example, antennas suitable for directional communication, e.g., using beamforming techniques. For example, antennas 108, 154 and/or 144 may include a phased array antenna, a multiple element antenna, a set of switched beam antennas, and/or the like. In some embodiments, antennas 108, 154 and/or 144 may implement transmit and receive functionalities using separate transmit and receive antenna elements. In some embodiments, antennas 108, 154 and/or 144 may implement transmit and receive functionalities using common and/or integrated transmit/receive elements.

In some demonstrative embodiments, node 101 may also include, for example, one or more of a processor 120, a memory unit 122, and a storage unit 124. Node 101 may optionally include other suitable hardware components and/or software components. In some demonstrative embodiments, some or all of the components of node 101 may be enclosed in a common housing or packaging, and may be interconnected or operably associated using one or more wired or wireless links. In other embodiments, components of node 101 may be distributed among multiple or separate devices.

Processor 120 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 120 executes instructions, for example, of an Operating System (OS) of node 101 and/or of one or more suitable applications.

Memory unit 122 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 124 includes, for example, a hard disk drive, a floppy disk drive, a Compact Disk (CD) drive, a CD-ROM drive, a DVD drive, or other suitable removable or non-removable storage units. Memory unit 122 and/or storage unit 124, for example, may store data processed by node 101.

In some demonstrative embodiments, antenna array 108 may include a plurality of antenna elements, e.g., as described below. The plurality of antenna elements of the antenna array may be configured, for example, for creation of a plurality of highly-directional antenna patterns. The plurality of antenna elements may include, for example, about 16-36 antenna elements, or any other number of antenna elements, which may be placed in a predefined geometry. The plurality of antenna elements may be configured to form a plurality of highly directive antenna patterns or beams, which may be steered by setting appropriate signal phases at the antenna elements, e.g., as described below.

In some demonstrative embodiments, wireless communication unit 102 may be configured to control antenna array 108 to generate and steer the plurality of beams to be directed to a plurality of other devices, e.g., including mobile devices 140 and 150. Wireless communication unit 102 may communicate with the plurality of other devices via a plurality of wireless communication links over the plurality of beams formed by antenna array 108, as described in detail below.

In some demonstrative embodiments, one or more elements of system 100 may utilize the mmWave communication band to provide wireless connectivity for a relatively large coverage area. In one example, elements of system 100 may be deployed, for example, in outdoor spaces, e.g., a street, a stadium, and the like, and/or large indoor areas, e.g., conference halls, and the like.

For example, system 100 may include a plurality of small cells, e.g., a large number of small cells, which may be deployed to cover the large coverage area. A cell may include a wireless communication node, e.g., an AP or a BS, which may be configured to cover and/or serve a relatively small number of users, for example, mobile devices, e.g., User Equipment (UE), and the like. The deployment of the small cells may provide, for example, high-speed wireless access for communication by many users, e.g., simultaneously.

In one example, a cell may include node 101, which may serve one or more users, e.g., including mobile devices 140 and 150.

In some demonstrative embodiments, wireless communication node 101 may communicate with the mobile devices 140 and 150 of the first cell via a plurality of wireless communication links ("access links"). For example, wireless communication node 101 may communicate with mobile device 140 via a wireless access link 103, and with mobile device 150 via a wireless access link 119. Wireless access link 103 may include a downlink for communicating downlink data from wireless communication node 101 to mobile device 140 and/or an uplink for communicating uplink data from mobile device 140 to wireless communication node 101. Wireless access link 119 may include a downlink for communicating downlink data from wireless communication node 101 to mobile device 150 and/or an uplink for communicating uplink data from mobile device 150 to wireless communication node 101.

In some demonstrative embodiments, node 101 may be connected to a core network. For example, wireless communication node 101 may include at least one network interface 130 configured to communicate with at least one core network, e.g., a telephone network, the Internet, a Local Area Network (LAN), and the like, via one or more wired and/or wireless connections. For example, network interface 130 may include a modulator-demodulator (Modem), a Cable Modem, a router, and the like.

In some demonstrative embodiments, the core network may optionally be configured to enable communication between one or more elements of the wireless communication network, e.g., a plurality of nodes, over a wired connection.

Some demonstrative embodiments are described herein with reference to a device, e.g., node 101, utilizing one antenna array, for example, antenna array 108, e.g., a single antenna array, for communicating with a plurality of mobile devices, e.g., mobile devices 140 and 150. However, in other embodiments a device, e.g., a node or any other suitable device, may include a plurality of antenna arrays.

In some demonstrative embodiments, wireless access links 103 and/or 119 may include a wireless communication link over the mmWave band, e.g., the DMG band.

In some demonstrative embodiments, node 101, mobile device 150 and/or mobile device 140 may perform the functionality of mmWave STAs, e.g., DMG stations ("DMG STA"). For example, node 101, mobile device 140, and/or mobile device 150 may be configured to communicate over the DMG band.

In some demonstrative embodiments, wireless access links 103 and/or 119 may include a wireless beamformed link.

In some demonstrative embodiments, wireless access links 103 and/or 119 may include a wireless gigabit (WiGig) link. For example, wireless access links 103 and/or 119 may include a wireless beamformed link over the 60 GHZ frequency band.

In other embodiments, wireless access links 103 and/or 119 may include any other suitable link and/or may utilize any other suitable wireless communication technology.

In some demonstrative embodiments, wireless communication unit 102 may control antenna array 108 to form a plurality of directional beams, e.g., including beams 147 and 157, for communicating over a plurality of access links, e.g., including access links 103 and 119, with one or more mobile devices, e.g., mobile devices 140 and 150, e.g., as described below.

In some demonstrative embodiments, wireless communication unit 102 may control antenna array 108 to communicate over access links 103 and 119 according to a Multi-User (MU) Multi-Input-Multi-Output (MIMO) scheme. For example, wireless communication unit may control antenna array 108 to communicate a MIMO communication over a plurality of beams, including beam 157 directed to mobile device 150 and beam 147 directed to mobile device 140.

In some demonstrative embodiments, antenna array 108 may implement a very large aperture Modular Antenna Array (MAA) architecture, e.g., as described in detail below.

In some demonstrative embodiments, antenna array 108 may include a plurality of antenna modules 194.

The phrase "antenna module" as used herein may relate to an antenna sub-array coupled to a Radio-Frequency (RF) chain.

The phrase "antenna sub-array" as used herein may include a plurality of antenna elements, which are coupled to a common RF chain.

In some demonstrative embodiments, each of antenna modules 194 may include, for example, a plurality of antenna elements coupled to a common Radio-Frequency (RF) chain. The RF chain may be utilized, for example, for RF beamforming.

In some demonstrative embodiments, the plurality of antenna modules 194, may be connected to a central beamforming processor 197, which may be implemented, e.g., as part of a baseband (BB) processor, an Intermediate Frequency (IF) processor, or an RF. BF processor 197 may be configured to apply one or more MIMO techniques to communications performed via antenna array 108. The MIMO processing may be configured, for example, for throughput enhancement purposes by MU-MIMO processing, for coverage of a particular user, when the whole array may be used for achieving a very high antenna gain in the direction of the single user, and/or for any other purpose.

In some demonstrative embodiments, antenna array 108 may simultaneously communicate over a plurality of directional beams, e.g., beams 147 and 157, for example, to simultaneously communicate over access links 119 and 103 as part of a MIMO communication, e.g., a MU-MIMO transmission directed to mobile device 140 and 150.

In some demonstrative embodiments, wireless communication node 101 may be subject to various regulations and limitations, e.g., government regulations and limitations, for transmissions performed over one or more frequency bands. For example, the United States Federal Communications Commission (FCC) imposes a peak emission limit of a maximum power density of $S_{max}$=18 micro-Watt to square centimeter ($\mu W/cm^2$) for a millimeter-wave band, e.g., the frequency band of 59.05-64 GHz, as measured three meters from the transmit antenna, and a total transmitted power limit $P_{max}$=500 miliWatt (mW). Similar limitations exist in regulations of other countries.

In some demonstrative embodiments, the signal power density of a transmission transmitted by an antenna may be calculated, for example, as follows:

$$S = \frac{PG}{4\pi R^2} = \frac{EIRP}{4\pi R^2} \quad (1)$$

wherein S denotes the power density, in appropriate units, e.g., $mW/cm^2$; P denotes a power input to the antenna, in appropriate units, e.g., mW; G denotes a power gain of the antenna in a direction of the transmission; R denotes a distance to the center of radiation of the antenna, in appropriate units, e.g. cm; and EIRP denotes an equivalent isotropically radiated power.

In some demonstrative embodiments, a total transmit power of antenna array 108 and/or the signal power density of transmissions performed by antenna array 108 may be related to the number of antenna modules utilized by antenna array 108, e.g., if each antenna module utilized a predefined transmit power.

In some demonstrative embodiments, the total transmit power P utilized by antenna array 108 for a transmission may increase as the number of antenna modules increases, and/or the power gain G of antenna array 108 may increase with the number of antenna modules, e.g., since an increased number of antenna modules may increase the antenna aperture, which in turn may provide higher antenna gains. Antenna array 108 may also be limited to a maximal available transmit power, denoted $P_0$, which may include a total of the maximal transmit powers, which may be utilized by the plurality of antenna modules of antenna array 108.

In one example, the transmit power, antenna gain, EIRP, power density and reception distance of an antenna array, e.g., antenna array 108, may be related to the number of antenna modules, for example, as follows, e.g., if each antenna module has a fixed TX power of 10 mW:

TABLE 1

| # of modules | Array TX power, dBm | Array gain, dBi | EIRP, dBm | Power density at 3 m, $\mu W/cm^2$ | Distance for reception of $\pi/2$-64QAM, ½ (3.08 Gbps), m |
|---|---|---|---|---|---|
| 1 | 10 | 15 | 25 | 0.3 | 7 |
| 2 | 13 | 18 | 31 | 1.1 | 14 |
| 4 | 16 | 21 | 37 | 4.5 | 28 |
| 8 | 19 | 24 | 43 | 18* | 53 |
| 16 | 22 | 27 | 49 | 70 | 101 |
| 32 | 25 | 30 | 55 | 286 | 183 |

In some demonstrative embodiments, as can be seen from table 1, in a single user (SU) mode, an 8-module antenna array may reach the FCC signal power density limit, while 16-module or 32-module antenna arrays violate the FCC requirements, e.g., if utilizing the same predefined transmit power for all antenna modules. Reducing the transmit signal power of each of the antenna modules, e.g., in order to meet the FCC requirements, may result in a decrease in system throughput.

In some demonstrative embodiments, a transmit power control scheme may be utilized to control the transmit power, e.g., to avoid system degradation.

In some demonstrative embodiments, the transmit power control scheme may include an Intelligent Transmit Power Control Algorithm, which may be utilized, for example, for MU-MIMO techniques or for any other MIMO technique.

In some demonstrative embodiments, the transmit power control scheme may allow exploiting maximum TX power of large aperture MAAs, e.g., without violating transmit power requirements, e.g., the FCC requirements or any other requirements.

In some demonstrative embodiments, antenna array 108 may violate spectral power density limitations, e.g., if transmissions of antenna array 108 are performed at full power and at the highest possible antenna gain.

In some demonstrative embodiments, wireless communication node 101 may include a controller (also referred to as "transmit power controller") 198 to control a plurality of transmit powers of directional beams formed by antenna array 108, e.g., directional beams 147 and 157, for transmitting a wireless communication, e.g., to mobile devices 150 and 140, as described in detail below.

In some demonstrative embodiments, controller 198 may be implemented as part of wireless communication unit 102. In one example, controller 198 may be implemented as part of a BB processor of wireless communication unit 102. In other embodiments, controller 198 may be implemented as a dedicated element of node 101 or as part of any other element of node 101. In one example, controller 198 may be implemented as part of a host module of node 101.

In some demonstrative embodiments, controller 198 may control the plurality of transmit powers based on at least first and second power limits, the first power limit including a power density limit corresponding to a power density of a directional beam of the plurality of directional beams, and the second power limit including a total transmit power limit corresponding to a total of the transmit powers, e.g., as described below.

Some demonstrative embodiments may be configured to exploit the fact that the FCC specifies limits for the maximum power density, e.g., the power per square centimeter at the measurement distance.

In some demonstrative embodiments, controller 198 may be configured to control the transmit powers of a beamformed diversity transmission.

In some demonstrative embodiments, the beamformed diversity wireless transmission may include a Multi-Input-Multi-Output (MIMO) transmission.

The phrase "beamformed diversity communication", as used herein may relate to a communication utilizing a plurality of beams.

Some demonstrative embodiments are described herein with reference to a communication system, e.g., wireless communication system 100, wherein both a Transmit (TX) side and a Receive (RX) side, e.g., node 101 and mobile devices 140 and 150, utilize an antenna array to communicate a MIMO transmission. However, other embodiments may be implemented with respect to systems configured to communicate any other diversity communication, for example, systems in which only one of the Tx and Rx sides utilizes a multi-beam transceiver, e.g., to form a Single-Input-Multi-Output (SIMO) and/or a Multi-Input-Single-Output (MISO) beamformed link. For example, one of the Tx and Rx sides may utilize an omni-directional antenna, and another one of the Tx and Rx sides may utilize a multi-beam transceiver, e.g., wireless communication unit 142 or 152.

In some demonstrative embodiments, the beamformed diversity wireless transmission may include a Single-User (SU) MIMO transmission.

In some demonstrative embodiments, the beamformed diversity wireless transmission may include a Multi-User (MU) MIMO transmission, e.g., as described below.

In some demonstrative embodiments, controller 198 may arrange transmissions in a plurality of different directions simultaneously, for example, of a plurality of users, e.g., mobile devices 140 and 150, while keeping, for example, the same total TX transmitted power. As a result, the actual value of signal power density may be proportionally lower, despite the same total TX power. This may advantageously allow for FCC or any other power density requirements to be met.

Figure 2:
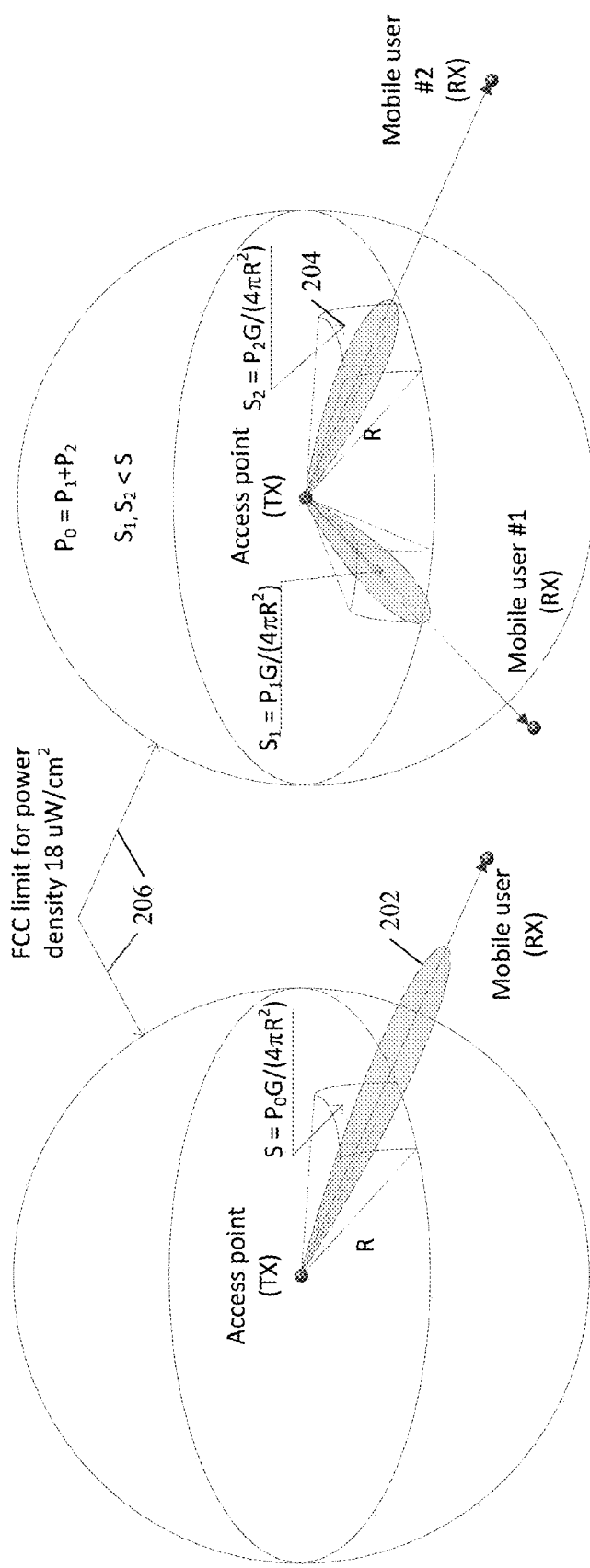
FIG. 2 is a schematic illustration of a signal power density of a Single-User (SU) transmission and a signal power density of a Multi-User (MU) transmission, in accordance with some demonstrative embodiments.

Reference is also made to FIG. 2, which schematically illustrates a signal power density 202 of a SU transmission and a signal power density 204 of MU transmission, in accordance with some demonstrative embodiments.

As shown in FIG. 2, if all TX power of an antenna array, e.g., antenna array 108 (FIG. 1), including a plurality of antenna modules, is radiated in the direction of a single user, a power density limit 206, e.g., according to the FCC requirements, may be violated As also shown in FIG. 2, in some demonstrative embodiments a MU transmission for two users, denoted user #1 and user #2, may be transmitted via two directional beams, e.g., directional beams 147 and 157 (FIG. 1) directed to mobile devices 140 and 150 (FIG. 1). Such MU transmission may enable decreasing the power density twice, e.g., if both users are placed at the same distance, P1=P2 and S1=S2, while keeping the total transmitted power, which may be set, for example, to the maximal transmit power $P_0$.

Referring back to FIG. 1, in some demonstrative embodiments controller 198 may control the transmit powers of directional beams 147 and 157 based on throughputs of directional beams 147 and 157 achievable by the transmit powers, e.g., as described below.

In some demonstrative embodiments, controller 198 may control the transmit powers of directional beams 147 and 157 based on a maximal combined throughput corresponding to the throughputs of directional beams 147 and 157, e.g., as described below.

In some demonstrative embodiments, the power density of a directional beam of directional beams 147 and/or 157 may be based on a transmit power of the directional beam and an antenna gain of antenna array 108 in a direction of the directional beam. For example, the power density of the directional beam may be determined according to Equation 1, e.g., as follows:

$$S_i = \frac{P_i G_i}{4\pi R^2} \qquad (2)$$

wherein $P_i$ denotes a transmit power of an i-th directional beam, Gi denotes an antenna gain of antenna array 108 in a direction of the i-th directional beam, R denotes a distance from antenna array 108 at which the power density is to be determined, and $S_i$ denotes the power density corresponding to the i-th directional beam.

In some demonstrative embodiments, the power density limit may relate to the power density at a predefined distance from antenna array 108. For example, the power density limit, e.g., according to the FCC requirements, may relate to the distance R=3 meters (m).

In some demonstrative embodiments, controller 198 may control the plurality of transmit powers $P_i$, e.g., the transmit powers of beams 147 and 157, to generate each of the plurality of directional beams, e.g., directional beams 147 and 157, having a power density equal to or lesser than the power density limit $S_{max}$, e.g., according to the following criterion:

$$\frac{P_i G_i}{4\pi R^2} \leq S_{max} \qquad (3)$$

In some demonstrative embodiments, the power density limit $S_{max}$ may have the value of $S_{max}$=18 µW/cm$^2$, e.g., according to the FCC requirements for the mmWave frequency band. In other embodiments, the power density limit $S_{max}$ may have any other value, for example, corresponding to any other requirements, rules and/or regulations, and/or corresponding to any other frequency band.

In some demonstrative embodiments, controller 198 may select a plurality of users to be included in a MU-MIMO transmission. For example, controller 198 may select the plurality of users based on channel propagation losses of a plurality of channels corresponding to the plurality of users.

In some demonstrative embodiments, controller 198 may select the plurality of users having channel propagation losses within a predefined channel propagation loss range, e.g., as described below.

In other embodiments, controller 198 may select one or more of the users for the MU-MIMO transmission based on any other additional or alternative criteria.

In some demonstrative embodiments, controller 198 may control the plurality of transmit powers $P_i$ of the plurality of directional beams, e.g., beams 147 and 157, based on throughputs to the plurality of users achievable by the plurality of transmit powers $P_i$.

In some demonstrative embodiments, controller 198 may control the plurality of transmit powers $P_i$ based on a maximal combined throughput corresponding to the throughputs to the users, e.g., as described below.

In some demonstrative embodiments, controller 198 may control the plurality of transmit powers to be used for the plurality of directional beams according to an Intelligent Transmit Power control algorithm, e.g., as described below. In other embodiments, controller 198 may controller 198 may control the plurality of transmit powers to be used for the plurality of directional beams according to any other operations, criteria and/or algorithms, e.g., including or more of the operations described below and/or other operations.

In some demonstrative embodiments, controller 198 may receive channel information representing one or more channel-related characteristics corresponding to a channel between node 101 and a user to be considered for MU-MIMO communication. The channel information may include, for example, a channel transfer function, denoted $H_i$, corresponding to a channel between an i-th user, e.g., including a propagation loss; a signal-strength indictor representing a power of a signal communicated over the channel, e.g., a Received Signal Strength Indicator (RSSI), and the like. In one example, the RSSI may correspond to a signal received by wireless communication unit 102, for example, wireless communication unit 102 may measure the RSSI corresponding to the user, e.g., based on uplink transmissions received from the user. In another example, the RSSI may correspond to a measurement performed by the user on a signal received by the user, for example, wireless communication unit 102 may receive the RSSI as part of an uplink transmission from the user.

For example, controller 198 may receive first channel information corresponding to mobile device 140, e.g., including a channel transfer function corresponding to a first channel between node 101 and mobile device 140, the propagation loss of the first channel, and/or the RSSI corresponding to the first channel; and/or second channel information corresponding to mobile device 150, e.g., including a channel transfer function corresponding to a second channel between node 101 and mobile device 150, the propagation loss of the second channel, and/or the RSSI corresponding to the second channel. Controller 198 may receive other channel information corresponding to one or more additional user (not shown in FIG. 1) to be considered for the MU-MIMO transmission.

In some demonstrative embodiments, controller 198 may select one or more users to be included in one or more sets of users for MU-MIMO transmission. For example, a set of users may include a plurality of users designated for receiving a common MU-MIMO transmission transmitted by wireless communication unit 102. In one example, controller 198 may select a plurality of sets of users, e.g., including a first set of users to receive a first MU-MIMO transmission, a second set of users to receive a second MU-MIMO transmission, and so on.

In some demonstrative embodiments, controller 198 may select the users to be assigned to a common set based on the channel information corresponding to the users, e.g., as described below. In other embodiments, controller 198 may select the users to be assigned to a common set based on any additional or alternative information and/or criteria.

In some demonstrative embodiments, controller 198 may select one or more sets of users, based on the propagation losses corresponding to the users.

In some demonstrative embodiments, controller 198 may select to include in the set users having similar propagation losses.

For example, controller 198 may select to include in a set a plurality of users having channel propagation losses is within a predefined channel propagation loss range.

In one example, controller 198 may select the users to be included in the set, such that a difference between a highest propagation loss of the users in the set and a lowest propagation loss of the users in the set is lesser than a predefined propagation loss threshold.

For example, controller 198 may include mobile device 140 and 150 in a first set and one or more other groups of mobile devices (not shown) in one or more other sets.

In some demonstrative embodiments, controller 198 may schedule the users of the set for simultaneous DL transmission, e.g., as part of a common MU-MIMO transmission group.

In some demonstrative embodiments, a number of users, denoted $N_{users}$, in a set may be limited by a number of possible MU data streams, which may be communicated via antenna array 108.

In some demonstrative embodiments, controller 198 may determine the plurality of transmit powers $P_i$ to be used for communicating a plurality of directional beams directed to the plurality of users in the set of users, e.g., as described below.

In some demonstrative embodiments, controller 198 may determine the plurality of transmit powers $P_i$ according to a total cell throughput criterion relating to a total achievable throughput to the plurality of users in the set of users, e.g., as described below.

In other embodiments, controller 198 may determine the plurality of transmit powers $P_i$ according to any additional or alternative criteria.

In some demonstrative embodiments, an achievable throughput of a link between node 101 and an i-th user of the set of users may depend on the transmit power $P_i$ of the i-th directional beam directed to the i-th user. For example, one or more users of the set may require using a relatively higher transmit power, e.g., to achieve an efficient Modulation and Coding Scheme (MCS) and/or any other attribute, while one or more other users of the set may require a relatively lower transmit power, e.g., if the users are located relatively close to node 101.

In one example, an achievable throughput of link 103 between node 101 and mobile device 140 may depend on the transmit power $P_1$ of directional beam 147 directed to mobile device 140; and/or an achievable throughput of link 119 between node 101 and mobile device 150 may depend on the transmit power $P_2$ of directional beam 157 directed to mobile device 150.

In some demonstrative embodiments, controller 198 may control the plurality of transmit powers $P_i$ based on a maximal combined throughput corresponding to the throughputs of the plurality of directional beams.

For example, controller 198 may determine the transmit power $P_1$ of directional beam 147 directed to mobile device 140 and the transmit power $P_2$ of directional beam 157 directed to mobile device 150 based on a combined throughput achievable by the transmit powers $P_1$ and $P_2$.

In one example, controller 198 may determine the transmit powers $P_1$ and $P_2$, e.g., to maximize a sum of a first throughput achievable over link 103 using the transmit power $P_1$ for directional beam 147 and a second throughput achievable over link 119 using the transmit power $P_2$ for directional beam 157.

In some demonstrative embodiments, controller 198 may determine the plurality of transmit powers $P_i$ to maximize a total throughput, denoted $Th_{total}$, e.g., a total cell throughput, for example, as follows:

$$Th_{total} = \sum_{i=1}^{N_{users}} Th_i \to \max \qquad (4)$$

wherein $Th_i$ denotes an i-th throughput achievable by the i-th directional beam directed to the i-th user using the transmit power $P_i$.

In some demonstrative embodiments, controller 198 may determine the transmit powers $P_i$ according to the criterion of Equation 4, while meeting two limitations, e.g., as described below. In other embodiments, controller 198 may determine the transmit powers $P_i$ according to Criterion 4, while meeting any other additional or alternative limitations, e.g., according to any other rules, regulations and/or requirements.

In some demonstrative embodiments, controller 198 may determine the transmit powers $P_i$ according to the following limitation:

$$\sum_{i=1}^{N_{users}} P_i \leq P_0 \leq P\max \qquad (5)$$

wherein $P_{max}$ denotes a total transmit power limit, for example, according to the FCC requirements, e.g., $P_{max}$=500 mW, or any other total transmit power limit In some demonstrative embodiments, controller 198 may determine the transmit powers $P_i$ according to the following limitation, e.g., as discussed above:

$$\frac{P_i G_i}{4\pi R^2} \leq S_{max}, R = 3 \text{ meter} \qquad (6)$$

In some demonstrative embodiments, the power density limit $S_{max}$ may have the value of $S_{max}$=18 µW/cm², e.g., according to the FCC requirements for the mmWave frequency band. In other embodiments, the power density limit $S_{max}$ may have any other value and/or the distance R may be set to any other value greater than or lesser than 3 m, for example, corresponding to any other requirements, rules and/or regulations, and/or corresponding to any other frequency band.

In some demonstrative embodiments, controller 198 may determine the transmit powers $P_i$ by solving an optimization problem according to Criterion 4 with the constraints of Limitations 5 and 6.

In some demonstrative embodiments, controller 198 may solve the optimization problem according to one solution scheme, for example, by setting the transmit powers $P_i$ to achieve the power densities $S_i$, which are equal to the value of $S_{max}$ e.g., as follows:

$$\frac{P_i G_i}{4\pi R^2} \leq S_{max}, R = 3 \text{ meter} \qquad (7)$$

This solution scheme may provide a relatively simplified and straightforward solution scheme.

In some demonstrative embodiments, controller 198 may solve the optimization problem according to one solution scheme, for example, utilizing a non-linear optimization algorithm. In one example, controller 198 may solve the optimization problem according to a Karush-Kuhn-Tucker (KKT) algorithm, for example, by using Criterion 4 as a KKT cost function and Limitations 5 and 6 as KKT conditions.

In other embodiments, controller 198 may solve the optimization problem according to any other algorithm.

In some demonstrative embodiments, controlling the transmit powers $P_i$, e.g., as described herein, may enable compliance with signal power density requirements, while providing an improved, e.g., a highest, achievable throughput for MU-MIMO communication.

In some demonstrative embodiments, controlling the transmit powers $P_i$, e.g., as described herein, for a SU transmission may limit the TX power to comply with signal power density requirements.

Figure 3:
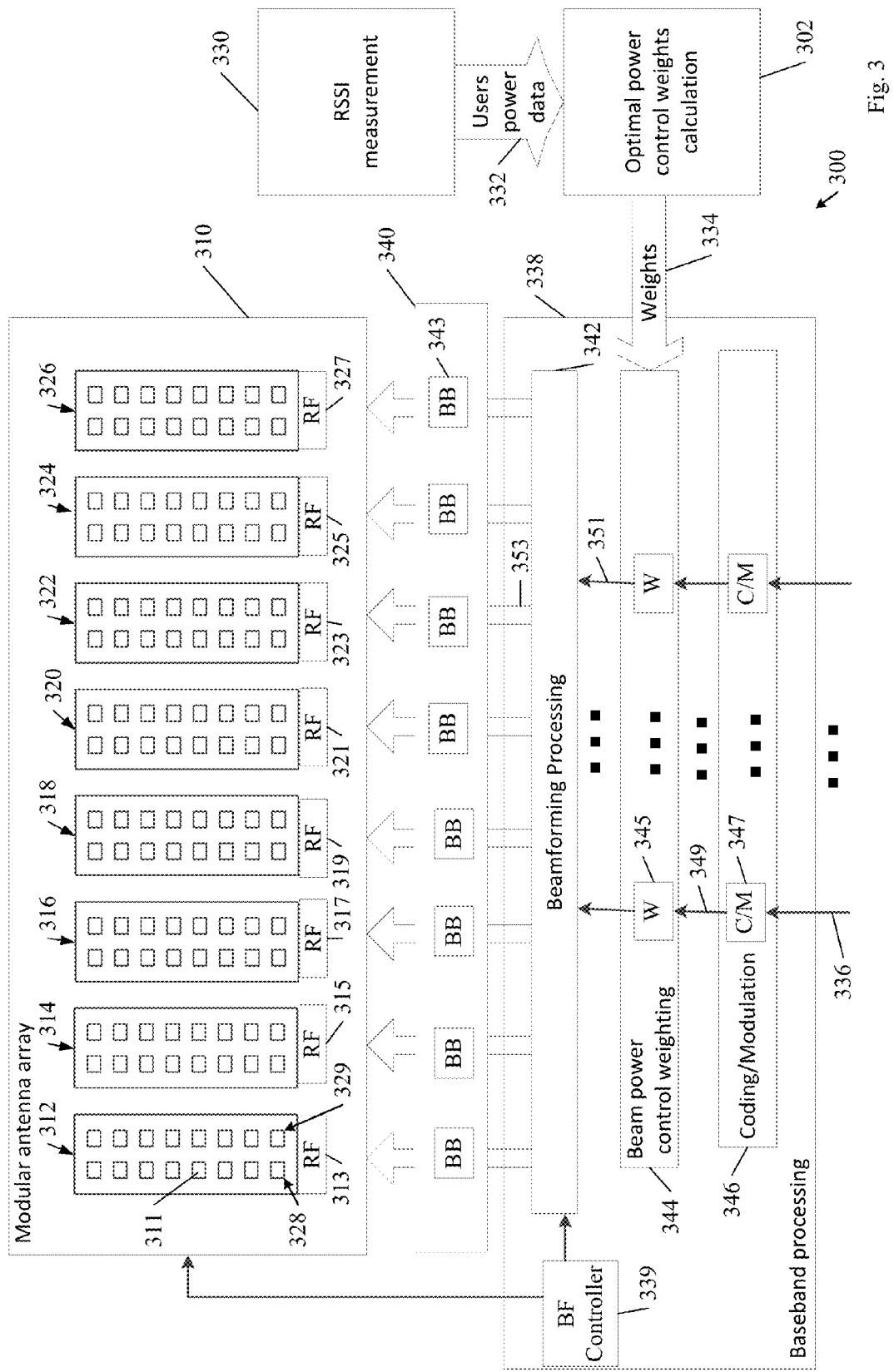
FIG. 3 is a schematic illustration of a communication device including a transmit power controller, in accordance with some demonstrative embodiments.

Reference is made to FIG. 3, which schematically illustrates a communication device 300 including a transmit power controller 302, in accordance with some demonstrative embodiments. For example, communication device 300 may perform the functionality of wireless communication node 101 (FIG. 1) and/or transmit power controller 302 may perform the functionality of controller 198 (FIG. 1).

In some demonstrative embodiments, wireless communication device 300 may include a modular antenna array 310. For example, antenna array 310 may perform the functionality of antenna array 108 (FIG. 1).

In some demonstrative embodiments, antenna array 310 may include a two-dimensional array of antenna elements formed by an array of antenna modules. For example, as shown in FIG. 3, the two-dimensional array of antenna elements may be formed by an array of vertically oriented antenna modules.

In some demonstrative embodiments, antenna array 310 may include at least one row of antenna modules, wherein each antenna module includes an antenna sub-array having at least one column of antenna elements.

For example, as shown in FIG. 3, antenna array 310 may include a row of eight antenna modules 312, 314, 316, 318, 320, 322, 324 and 326, which may be concatenated, for example, along a horizontal axis. Each of antenna modules 312, 314, 316, 318, 320, 322, 324 and 326 may include an antenna sub-array including two columns of antenna elements 311, which may be arranged, for example, along a vertical axis. For example, as shown in FIG. 3, antenna module 312 may include a first column 328 of eight antenna elements 311 and a second column 329 of eight antenna elements 311.

According to the example shown in FIG. 3, antenna array 310 may include 128 antenna elements 311 arranged in a two-dimensional array of 8 rows and 16 columns. In other embodiments, an antenna array may include any other number of antenna elements arranged in any other number of columns within any other number of antenna modules.

In some demonstrative embodiments, the antenna elements 311 of an antenna module of array 310 may be coupled to a common RF chain. For example, as shown in FIG. 3, the sixteen antenna elements 311 of antenna module 312 may be coupled to a common RF chain 313; the sixteen antenna elements 311 of antenna module 314 may be coupled to a common RF chain 315; the sixteen antenna elements 311 of antenna module 316 may be coupled to a common RF chain 317; the sixteen antenna elements 311 of antenna module 318 may be coupled to a common RF chain 319; the sixteen antenna elements 311 of antenna module 320 may be coupled to a common RF chain 321; the sixteen antenna elements 311 of antenna module 322 may be coupled to a common RF chain 323; the sixteen antenna elements 311 of antenna module 324 may be coupled to a common RF chain 325; and the sixteen antenna elements 311 of antenna module 326 may be coupled to a common RF chain 327.

In some demonstrative embodiments, antenna modules 312, 314, 316, 318, 320, 322, 324 and 326 may be capable of generating a plurality of directional beams, e.g., up to eight directional beams.

In some demonstrative embodiments, the vertical orientation of antenna modules 312, 314, 316, 318, 320, 322, 324 and 326 may enable steering the plurality of beams in a vertical plane, e.g., along the vertical axis. The steering of the beams in the vertical plane may be performed, for example, by RF beamforming, which may be controlled by RF chains 313, 315, 317, 319, 321, 323, 325 and/or 327. For example, RF chain 313 may control antenna module 312 to generate a directional beam, which may be steerable in the vertical plane, for example, by adjusting phase shifts applied by RF chain 313 to antenna elements 311 of columns 328 and/or 329.

In some demonstrative embodiments, an antenna array, e.g., antenna array 310, may include a single row of antenna modules, e.g., antenna modules 312, 314, 316, 318, 320, 322, 324 and 326, wherein each antenna module includes a sub-array of one or more columns, e.g., two columns, of antenna elements, e.g., antenna elements 311, coupled to a common RF chain.

However, in other embodiments, the antenna array may include any other number of rows of antenna modules, and/or each antenna module may include an antenna sub-array including any other number of columns of antenna elements, e.g., one or more columns. In one example, the antenna array may include two or more rows of antenna modules.

In some demonstrative embodiments, wireless communication device 300 may communicate a MU-MIMO communication including a plurality of data streams 336 communicated with a plurality of users, e.g., including mobile devices 140 and/or 150 (FIG. 1).

In some demonstrative embodiments, controller 302 may receive user power data 332 corresponding to a plurality of users to be scheduled for MU-MIMO. User power data 332 may include, for example, RSSI data and/or any other channel-related information, e.g., as described above. In one example, wireless communication device 300 may include an RSSI measurement module 330 to provide user power data 332.

In some demonstrative embodiments, wireless communication device 300 may include a BB processor 338 to perform BB processing of data streams 336 to be communicated as part of the MU-MIMO transmission. For example, data streams 336 may include the plurality of data streams to be transmitted to the plurality of users, e.g., mobile devices 140 and 150 (FIG. 1), e.g., via links 103 and 119 (FIG. 1), as described above.

In some demonstrative embodiments, modular antenna array 310 may be configured to perform hybrid beamforming. The hybrid beamforming may include, for example, performing a coarse beamforming in RF modules 313, 315, 317, 319, 321, 323, 325 and/or 327; and fine beamforming in baseband 338.

In one example, the coarse beamforming and/or fine beamforming may be performed, for example, as part of a beamforming procedure for setting up a beamformed link.

In some demonstrative embodiments, the fine beamforming may include diversity processing, e.g., MIMO processing, MISO processing and/or SIMO processing, at baseband 338. For example, the MIMO processing may include, for example, closed-loop (CL) MIMO processing, Open Loop (OL) MIMO processing, Space-Block Code (SBC) MIMO processing, e.g., Space Time Block Code (STBC) MIMO processing, Space Frequency Block Code (SFBC) MIMO processing, and the like.

In some demonstrative embodiments, BB processor 338 may include a coding and modulation block 346 to process the plurality of data streams 336. For example, coding and modulation block 346 may include a plurality of coding and modulation modules 347 configured to perform at least forward error correction and/or modulation mapping to data streams 336.

In some demonstrative embodiments, controller 302 may determine the plurality of transmit powers $P_i$ to be applied to a plurality of directional beams directed to the plurality of users, e.g., as described above. For example, controller 302 may determine the plurality of transmit powers $P_i$ based on user power data 332.

In some demonstrative embodiments, controller 302 may determine a plurality of beamforming (BF) power weights 334 corresponding to the determined transmit powers $P_i$. The BF power weights 334 may be configured to result in the plurality of directional beams being transmitted using the transmit powers $P_i$, e.g., as described below.

In some demonstrative embodiments, BB processor 338 may be configured to configure beam power weights for each beam of the MU-MIMO transmission, e.g., based on weights 334.

In some demonstrative embodiments, BB processor 338 may include a beam power control weighting block 344 to apply BF power weights 334 as part of the BF processing of data 336.

In some demonstrative embodiments, beam power control weighting block 344 may include a plurality of weighting modules 345 to apply the plurality of weights to a plurality of streams 349 processed by coding and modulation modules 347. For example, a weighting module 345 corresponding to a particular data stream of data streams 336 may be configured to apply a weight configured to result in the transmit power $P_i$ corresponding to the particular data stream 336.

In some demonstrative embodiments, beam power control weighting modules 345 may be configured to multiply signal waveform sample magnitudes of streams 349 by beam power weights 334. A beam power weight 334 may be configured such that, for example, an i-th beam power Pi produced by antenna array 310 in the direction of the i-th user may have a value of Xi+Yi decibel-miliWatt (dBm), wherein Yi denotes an i-th beam power control weight, expressed in dBm, corresponding to the i-th user, and Xi denotes a transmit power, expressed in dBM, of antenna array 310 in the direction of the i-th user, e.g., in the absence of beam power control weighting. In one example, the beam power control weights Yi expressed in dB may be greater than zero, e.g., representing i-th beam power boosting, less than zero, e.g., representing i-th beam power attenuation, or equal to zero, e.g., representing no beam power adjustment.

In some demonstrative embodiments, BB processor 338 may include a BF processing block 342 to generate the MU-MIMO beams for communicating data streams 336.

In some demonstrative embodiments, BF processing block 342 may apply fine beamforming processing to the streams 351 processed by weighting modules 345, e.g., as described herein.

In some demonstrative embodiments, BF processing block 342 may process the streams 351 into a plurality of signals 353 to be transmitted via antenna modules 312, 314, 316, 318, 320, 322, 324 and 326. For example, BF processing block 342 may process the streams 351 into signals 353, e.g., such that each of streams 351 is transmitted via a combination of antenna modules 312, 314, 316, 318, 320, 322, 324 and 326.

In some demonstrative embodiments, BB processor 338 may include a central BF controller 339 configured to control the BB BF applied by BF processing module 342 and the RF BF applied by antenna modules 312, 314, 316, 318, 320, 322, 324 and 326, e.g., as described above. For example, controller 339 may control BF weights applied to the MIMO transmission. In one example, BF controller may perform the functionality of BF processor 197 (FIG. 1).

In some demonstrative embodiments, blocks 342 and/or 344 may perform the functionality of BF processor 197 (FIG. 1).

In some demonstrative embodiments, wireless communication device 300 may also include a BB processing block 340 including a plurality of BB processing chains 343 to process the plurality of signals 353. For example, each processing chain 343 may process signals to be transmitted via a respective antenna module of antenna modules 312, 314, 316, 318, 320, 322, 324 and 326. A BB processing chain 343 may perform frequency conversion, e.g., from a BB frequency of BB 338 to an RF frequency to be used by the RF modules of antenna array 310, and/or OFDM processing, e.g., if the MU-MIMO transmission comprises an OFDM transmission. In one example, BB chain 343 may be configured to perform Inverse-Fast-Fourier-Transform (IFFT), guard interval insertion, and/or Digital to Analog-Conversion (DAC).

Reference is now made to FIGS. 4A, 4B and 4C which schematically illustrate isometric, side and top views of a radiation pattern of a beam 407 generated by an antenna module 400, in accordance with some demonstrative embodiments. In one example, radiation pattern 404 may represent a radiation pattern of an individual antenna module of an antenna array, e.g., antenna array 108 (FIG. 1) and/or antenna array 310 (FIG. 3). For example, antenna module 400 may perform the functionality of an antenna module of antenna modules 312, 314, 316, 318, 320, 322, 324 and/or 326 (FIG. 3).

In some demonstrative embodiments, the radiation pattern of beam 407 may have a first beam-width 408 in a first plane, e.g., a vertical plane, including an axis, e.g., a vertical axis 403, parallel to the one or more columns of antenna elements of antenna module 400.

In some demonstrative embodiments, the radiation pattern of beam 407 may have a second beam-width 406 in a second plane, e.g., a horizontal plane, including an axis, e.g., a horizontal axis 405, perpendicular to the one or more columns of antenna elements of antenna module 400.

In some demonstrative embodiments, beam-width 408 may be relatively narrow, e.g., in the vertical plane, and beam-width 406 may be relatively wide, e.g., in the horizontal plane.

In some demonstrative embodiments, the beam generated by antenna module 400 may be steered in both horizontal and vertical directions. For example, as shown in FIG. 4B, the beam 407 generated by module 400 may be steered in a vertical direction 416. As shown in FIG. 4C, the beam 407 generated by module 400 may be steered in a horizontal direction 418.

In some demonstrative embodiments, the steering of the beam formed by antenna module 400 may be controlled, for example, by RF beamforming at an RF chain 402 of antenna module 400 and/or by BB beamforming, e.g., at BF processor 197 (FIG. 1) or BF weighting module 342 (FIG. 3).

In some embodiments, the beamforming in the vertical plane may be mostly, e.g., even entirely, performed by the RF beamforming circuits in antenna module 400, for example, if an antenna array includes a single row of antenna modules, e.g., as described above with reference to FIG. 3.

In some demonstrative embodiments, some of the beamforming in the vertical plane, e.g., coarse beamforming, may be performed by the RF beamforming circuits in antenna module 400, and some of the beamforming in the vertical plane, e.g., fine beamforming, may be performed, e.g., by BF processor 197 (FIG. 1) or BF weighting module 342, for example, if an antenna array includes a plurality of rows of antenna modules.

In some demonstrative embodiments, antenna module 400 may produce a relatively wide beam in the horizontal plane, e.g., as shown in FIGS. 4A and 4C.

In some demonstrative embodiments, the relatively wide beam-width 406 in the horizontal plane may enable utilizing each antenna module 400, or even a column of antenna elements of module 400, as an "antenna element" of a multi-element modular antenna array.

In some demonstrative embodiments, antenna module 400 may be controlled to provide a variable directivity pattern in the horizontal plane, e.g., if antenna module 400 includes more than one column of antenna elements, e.g., two columns of antenna elements 328 and 329 (FIG. 3).

In some demonstrative embodiments, this modular antenna array configuration may enable performing beamformed diversity communication in the horizontal plane, e.g., utilizing a plurality of directional beams, formed in the horizontal plane.

In some demonstrative embodiments, BF processing, e.g., by BF processor 197 (FIG. 1) or BF weighting module 342 (FIG. 3), may process signals communicated via antenna array 108 (FIG. 1) according to any suitable multi-antenna processing schemes and/or techniques, e.g., to achieve the beamformed diversity in the horizontal plane. The multi-antenna processing techniques may include, for example, beam steering, interference suppression, single-user or multi-user MIMO, and the like.

In some demonstrative embodiments, wireless communication unit 102 (FIG. 1) may be configured to communicate the beamformed diversity communication via antenna array 108 (FIG. 1) according to a MU-MIMO scheme. It may be beneficial to utilize the MU-MIMO scheme for communication over the mmWave frequency band, for example, due to the nature of signal propagation in the mmWave band, e.g., which may be characterized by a strong Line-of-Sight (LOS) component, sharp shadowing and/or weak multi-path components in the channel.

Figure 4F:
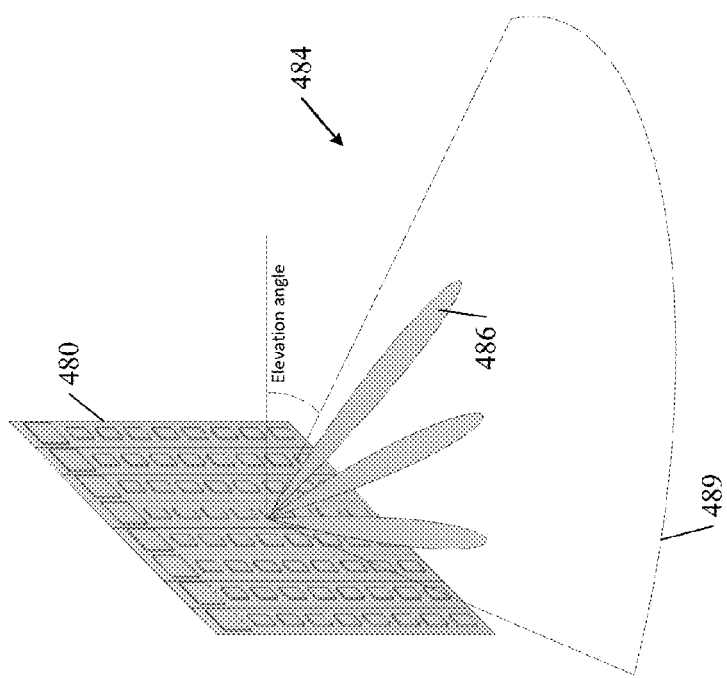
FIGS. 4A, 4B and 4C are isometric, side and top views of a radiation pattern of an antenna module, in accordance with some demonstrative embodiments.
FIG. 4D schematically illustrates a composite beam generated by an antenna array, and FIGS. 4E and 4F, schematically illustrate a first beamforming (BF) scheme and a second BF scheme for steering the composite beam, in accordance with some demonstrative embodiments.
Figure 4E:
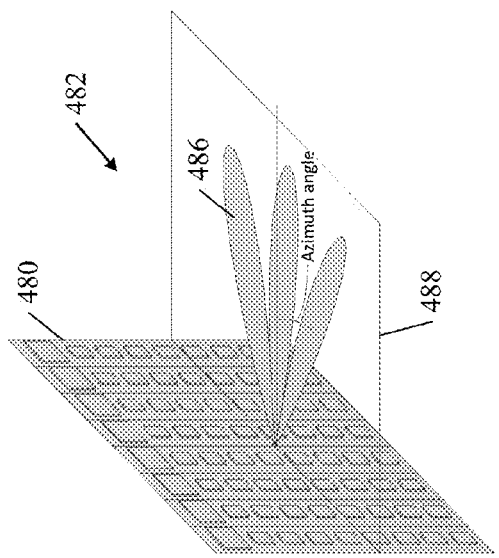
Figure 4D:
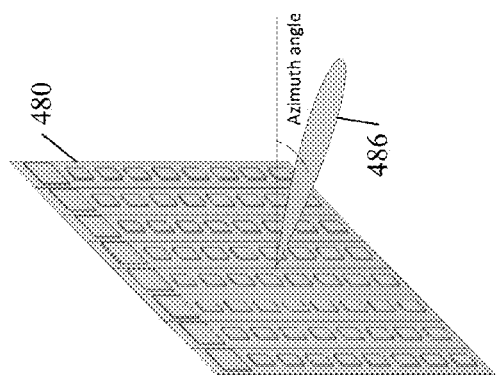

Reference is now made to FIG. 4D, which schematically illustrates a composite beam 486 generated by an antenna array 480, and FIGS. 4E and 4F, which schematically illustrate a first beamforming (BF) scheme 482 and a second BF scheme 484 for steering composite beam 486, in accordance with some demonstrative embodiments. In one example, antenna array may perform the functionality of antenna array 108 (FIG. 1).

In some demonstrative embodiments, composite beam 486 may be formed as a combination of beams generated by a plurality of antenna modules of antenna array 480, e.g., as described above.

In some demonstrative embodiments, antenna array 480 may steer composite beam 486 by performing BF in a direction ("vertical BF" or "elevation BF")) along a vertical axis of array 480, for example, by RF chains of the antenna modules, e.g. RF modules 313, 315, 317, 319, 321, 323, 325 and/or 327

(FIG. 3). Additionally or alternatively, antenna array 480 may steer composite beam 486 by performing BF in a direction ("horizontal BF" or "azimuth BF") along a horizontal axis of array 480, for example, by BF processor 197 (FIG. 1) or BF weighting module 342 (FIG. 3), e.g., as described below.

In some demonstrative embodiments, the azimuth BF may be performed by BF processor 197 (FIG. 1) or BF weighting module 342 (FIG. 3), for example, while applying substantially the same elevation BF. For example, beams 147 and 157 (FIG. 1) may be steered in substantially the same elevation angle, while BF processor 197 (FIG. 1) or BF weighting module 342 (FIG. 3) applies the azimuth BF.

In one example, as shown in FIG. 4E, composite beam 486 may be steered within a an azimuth surface, which may take the form of a plane ("horizontal plane") 488 perpendicular to antenna array 480, for example, by applying a zero elevation angle with respect to an antenna bore sight of antenna array 480.

In another example, as shown in FIG. 4F, the "horizontal plane" may take the form of a conical surface 489 corresponding to the elevation angle, for example, if a non-zero elevation angle is applied.

In some demonstrative embodiments, schemes 482 and/or 484 may be utilized for MU-MIMO in the azimuth surface, e.g., surfaces 488 and/or 489. For example, all antenna modules of antenna array 480 may be controlled, e.g., by BF controller 197 (FIG. 1) or BF weighting module 342 (FIG. 3), to apply the same elevation BF. As a result, all beams created by the antenna modules in azimuth may have the same elevation angle, with different, e.g., independent, azimuth angles.

In some demonstrative embodiments, the total power radiated by array 480 may be limited. Therefore, the lesser beams are created the more power may be allocated to each individual beam. Accordingly, less beams may be used, e.g., if increased power is required, e.g., to reach users at a far distance from antenna array 480, e.g., as described below with reference to FIG. 5B.

Figure 5B:
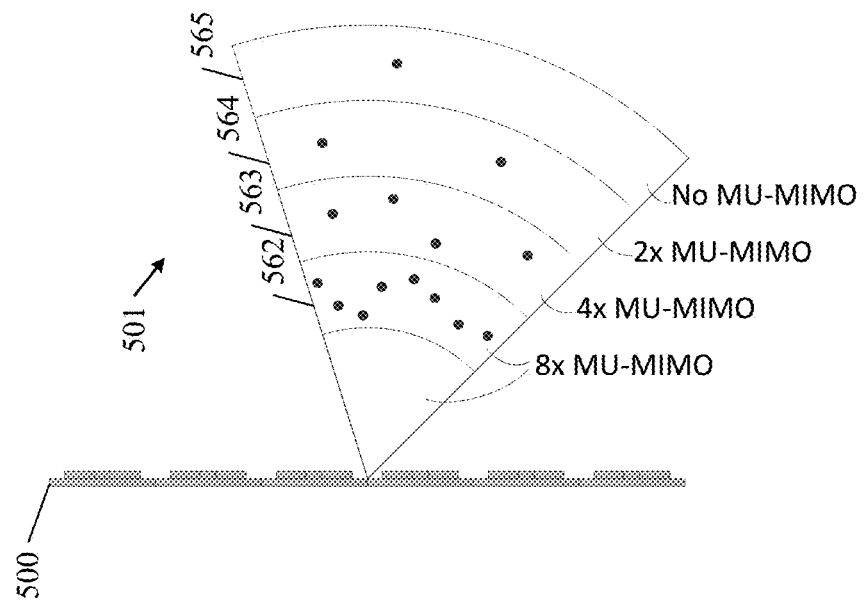
FIGS. 5A and 5B are schematic illustrations of a coverage area of an antenna array, in accordance with some demonstrative embodiments.
Figure 5A:
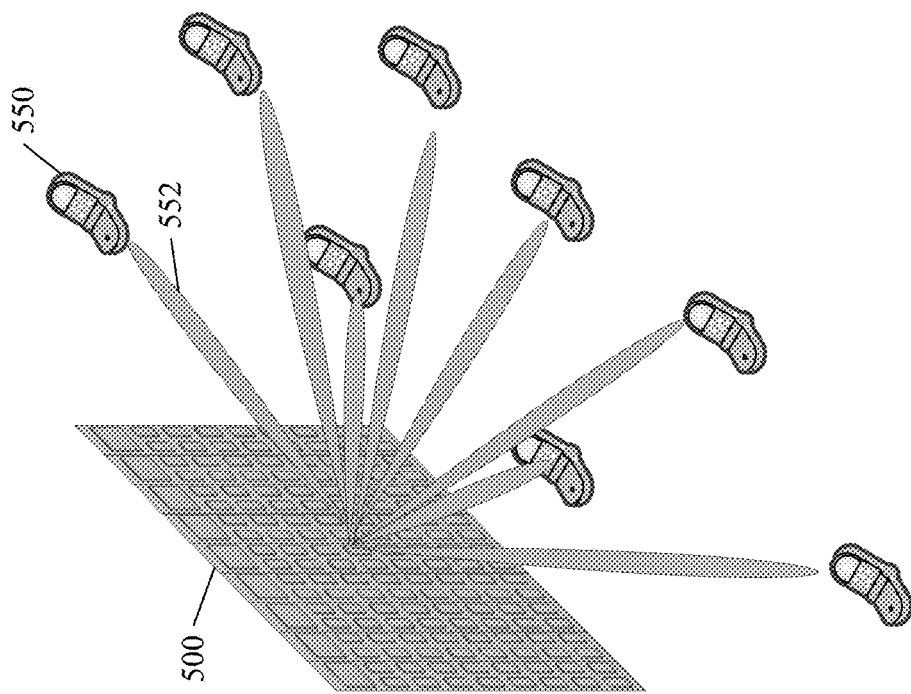

Reference is now made to FIGS. 5A and 5B, which schematically illustrate a coverage area of an antenna array 500, in accordance with some demonstrative embodiments. For example, antenna array 500 may perform the functionality of antenna array 108 (FIG. 1), antenna array 310 (FIG. 3), and/or antenna array 480 (FIGS. 4C, 4D and 4E).

In some demonstrative embodiments, antenna array 500 may be controlled, e.g., by BF processor 197 (FIG. 1), to communicate a beamformed diversity communication utilizing a plurality of beams 552 directed to a plurality of users 550, e.g., including mobile devices 140 and/or 150 (FIG. 1). In one example, antenna array 500 may be implemented as part of a base station (BS), an access point (AP), a node, and the like; and/or users 550 may include UE, e.g., mobile devices.

In some demonstrative embodiments, the number of users 550 which may be simultaneously served by antenna array 500 according to a MU-MIMO scheme may be based, for example, at least on channel qualities between antenna array 500 and each of the users 550, e.g., assuming that antenna array 500 has enough antenna elements to support a required number of spatial streams to be directed to the users 550. For example, the better the channel qualities, the more users may be served.

In some demonstrative embodiments, the channel quality between antenna array 500 and a user 550 may depend, for example, on a distance between the user and antenna array 500, as well as antenna gains and/or beam steering techniques applied to antenna array 500, e.g., assuming the user 550 utilizes a relatively omni-directional antenna to communicate with antenna array 500.

FIG. 5B illustrates a number of MU-MIMO coverage ranges, which may be achieved by antenna array 500, in accordance with some demonstrative embodiments.

As shown in FIG. 5B, a first number of users 550 may be simultaneously served, e.g., by a single BS, for example, within a first area 562, which may be at a first distance from antenna array 500, e.g., relatively close to antenna array 500. In one example, as shown in FIG. 5B, up to eight users 550 may be simultaneously served within area 562, for example, if antenna array 500 includes at least one row of eight antenna modules, e.g., as described above with reference to FIG. 3.

In some demonstrative embodiments, the number of users 550 which may be simultaneously served may decrease, e.g., as the distance from antenna array increases. For example, as shown in FIG. 5B, up to a second number of users 550, which may be lesser than the first number of users, e.g., up to four users 550, may be simultaneously served by antenna array 550, within an area 563, which may be at a second distance, greater than the first distance, from antenna array 500; up to a third number of users 550, which may be lesser than the second number of users, e.g., up to two users 550, may be simultaneously served by antenna array 550, within an area 564, which may be at a third distance, greater than the second distance, from antenna array 500; and/or only SU-MIMO communication may be performed within an area 565, which may be at a fourth distance, greater than the third distance, from antenna array 500.

In some demonstrative embodiments, a shape of the area where MU-MIMO is supported may be determined by the horizontal directivity pattern of an antenna module, e.g., antenna module 400 (FIG. 4A), of antenna array 500. Accordingly, the MU-MIMO coverage area of antenna array 500 may have a shape of a sector 501, e.g., as shown in FIG. 5B.

In some demonstrative embodiments, the directivity pattern of antenna module 400 (FIG. 4A), and the RF beamforming settings of antenna module 400 (FIG. 4A), e.g., as controlled by RF chain 402 (FIG. 4A), may define sector 501. The MU-MIMO communication scheme may be achieved, for example, via beamforming of the entire composite modular antenna array 500, e.g., by BF processor 197 (FIG. 1).

In some demonstrative embodiments, sector 501 may be re-oriented, for example, via RF beamforming, e.g., of RF chain 402 (FIG. 4A), to serve, for example, users 550 in a different area.

In some demonstrative embodiments, antenna array 500 may be implemented by a BS, which may be placed at some height above the ground, e.g. mounted on a roof, lamp-post, or near a ceiling of a shopping mall. Communicating with users placed at different distances from the BS may require the BS to apply different elevation angles, e.g., as described above with reference to FIG. 4F.

In some demonstrative embodiments, it may be efficient to simultaneously serve only the users that have substantially similar distance from the BS, e.g., since for efficient beamforming in azimuth all antenna modules should apply substantially the same elevation angle, as discussed above. Accordingly, the BS may use the elevation angle to select such users form the plurality of the users in the cell.

In some demonstrative embodiments, a narrower azimuth beam-width may be achieved, for example, by utilizing an antenna array having a configuration ("multi-column configuration") including a plurality of columns of antenna elements per antenna module, e.g., as described above with reference to FIG. 3.

In some demonstrative embodiments, the multi-column configuration may be utilized for performing fine azimuth BF, e.g., by BF processor 197 (FIG. 1). For example, all antenna modules may be controlled to steer a plurality of beams, e.g., including at least corresponding beams from different sub-array modules, in substantially the same direction. Different fine BF settings may be applied, e.g., by BF processor 197 (FIG. 1), to steer a composite beam formed by the plurality of beams in azimuth within the boundaries of the azimuth beam width of a single antenna module.

Figure 5D:
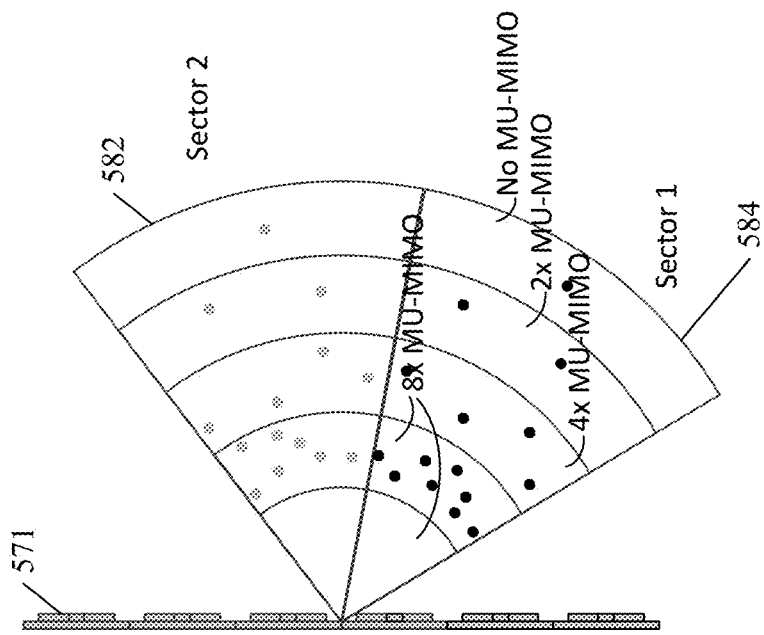
FIG. 5D schematically illustrates first and second azimuth coverage sectors, in accordance with some demonstrative embodiments.
Figure 5C:
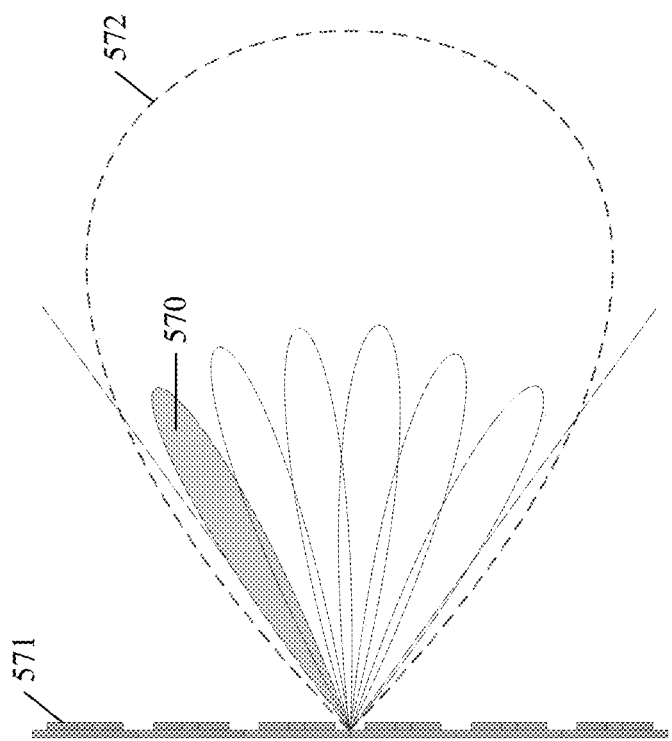
FIG. 5C schematically illustrates fine azimuth BF of a composite beam, in accordance with some demonstrative embodiments.

FIG. 5C schematically illustrates fine azimuth BF of a composite beam 570, in accordance with some demonstrative embodiments. For example, composite beam 570 may be generated by an antenna array 571 having a multi-column configuration, e.g., as described above with reference to FIG. 3.

In some demonstrative embodiments, composite beam 570 may be generated by controlling all antenna modules of antenna array 571 to steer a plurality of beams in the antenna bore sight direction. Different directions of beam 570 may be obtained, for example, by applying different BF settings, e.g., at BF processor 197 (FIG. 1). An area 572 between the azimuth steering boundaries may be viewed as a sector, which may be steered by changing the RF azimuth BF settings of all antenna modules.

In some demonstrative embodiments, composite beam 570 may be steered by the RF chains of the antenna array 571, e.g., without involving the fine beamforming, for example, if a single composite beam is created and the RF phase shifters have substantial accuracy of phase shifting, e.g. several degrees. However, this configuration may require much more complex RF phase shifters and, therefore, may be less suitable for creation of multiple beams carrying different data.

In some demonstrative embodiments, antenna array 571 may be able to steer coverage sector 572, e.g., as described below.

Reference is also made to FIG. 5D, which schematically illustrates a first sector 582 and a second sector 584, in accordance with some demonstrative embodiments. As shown in FIG. 5D, antenna array 571 may be able to steer the coverage sector, e.g., between coverage sectors 582 and 584, for example, by changing RF BF settings the modular antenna array.

In some demonstrative embodiments, the RF and BB beamforming algorithms may be coordinated. It is possible that BF processor 197 (FIG. 1) may try to steer a composite beam in a direction, which is out of the sector covered by RF azimuth beamforming. For example, BF processor 197 (FIG. 1) may try to steer the composite beam in the direction within the Sector 582, whereas the RF azimuth BF settings of the antenna modules of array 571 may direct the beams of the antenna modules in the direction of Sector 584. In such a case the result of the beamforming may be hardly predictable and/or the resulting beam may have a power considerably lesser than if the azimuth BF settings of the RF chains and BF processor 197 (FIG. 1) were coordinated.

In some demonstrative embodiments, in some circumstances, e.g., due to user motion, it may be difficult to find the required number of users placed at substantially the same distance from the BS and placed in such a way that allows creating independent beams for each of the users that would suppress interference between the user's transmissions. In these circumstances, a modular antenna array having the multi-column configuration, e.g., as described above with reference to FIG. 3, may provide an advantage, for example, as the multi-column configuration may enable the antenna array to adjust the coverage sector by adjusting the azimuth RF BF settings in the antenna modules. Therefore, the antenna array may have more chances to find a group of users of appropriate size that could be served simultaneously at the given distance.

Figure 6:
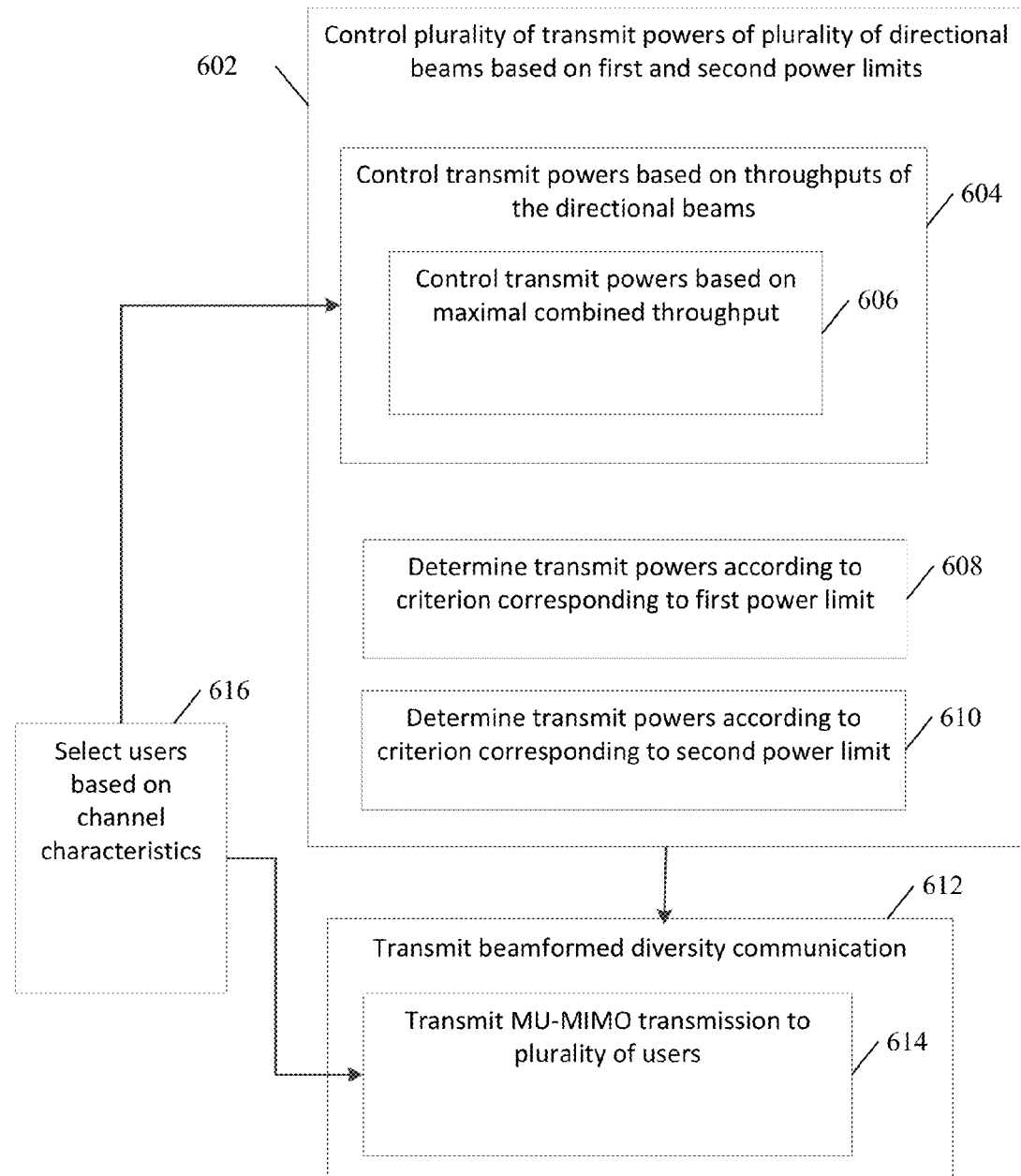
FIG. 6 is a schematic flow-chart illustration of a method of transmit power control for wireless communication, in accordance with some demonstrative embodiments.

Reference is now made to FIG. 6, which schematically illustrates a method of transmit power control for wireless communication, in accordance with some demonstrative embodiments. For example, one or more of the operations of the method of FIG. 6 may be performed by a wireless communication system, e.g., system 100 (FIG. 1); a wireless communication node, e.g., node 101 (FIG. 1); and/or a controller, e.g., controller 198 (FIG. 1).

As indicated at block 602, the method may include controlling a plurality of transmit powers of a plurality of directional beams formed by an antenna array for transmitting a wireless communication. The controlling may include controlling the transmit powers based on at least first and second power limits, the first power limit including a power density limit corresponding to a power density of a directional beam of the plurality of directional beams, and the second power limit including a total transmit power limit corresponding to a total of the transmit powers. For example, controller 198 (FIG. 1) may control the transmit powers $P_i$ based on the power density limit $S_{max}$ and the power limit $P_{max}$, e.g., as described above.

As indicated at block 604, controlling the transmit powers may include controlling the transmit powers based on throughputs of the directional beams achievable by the plurality of transmit powers. For example, controller 198 (FIG. 1) may control the transmit powers $P_i$ based on the achievable throughputs $Th_i$ achievable by the transmit powers $P_i$, e.g., as described above.

As indicated at block 606, controlling the transmit powers may include controlling the transmit powers based on a maximal combined throughput corresponding to the throughputs of the directional beams. For example, controller 198 (FIG. 1) may control the transmit powers $P_i$ to maximize the total throughput $Th_{total}$ achievable by the transmit powers $P_i$, e.g., as described above.

As indicated at block 608, the method may include determining the transmit powers according to a criterion corresponding to the first power limit. For example, controller 198 (FIG. 1) may determine the transmit powers $P_i$ according to Criterion 6, e.g., as described above.

As indicated at block 610, the method may include determining the transmit powers according to a criterion corresponding to the second power limit. For example, controller 198 (FIG. 1) may determine the transmit powers $P_i$ according to Criterion 5, e.g., as described above.

As indicated at block 612 the method may include transmitting a beamformed diversity communication via the plurality of directional beams.

As indicated at block 614, the method may include transmitting a MU-MIMO transmission directed to a plurality of users. For example, wireless communication unit 102 (FIG. 1) may transmit a MU-MIMO transmission to mobile devices 140 and 150 (FIG. 1) according to the transmit powers $P_i$.

As indicated at block 616, the method may include selecting the plurality of users based on channel-related characteristics of a plurality of channels corresponding to the plurality of users. For example, controller 198 (FIG. 1) may select the plurality of users, e.g., including mobile devices 140 and/or 150 (FIG. 1), for the MU-MIMO transmission based on the propagation losses of the channels corresponding to the users, e.g., as described above.

In some demonstrative embodiments, the method may include controlling the plurality of transmit powers based on throughputs to the plurality of users achievable by the plurality of transmit powers. For example, controller 198 (FIG. 1) may control the transmit powers $P_i$ based on the throughputs corresponding to the selected set of users, e.g., as described above.

Figure 7:
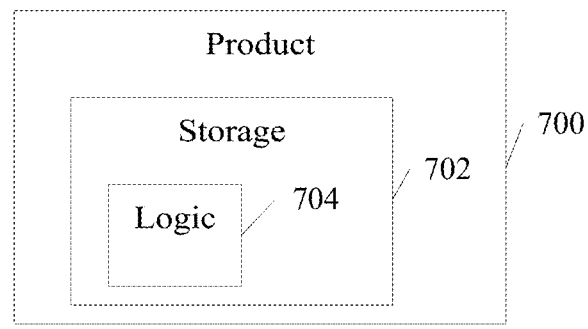
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of wireless communication node 101 (FIG. 1), wireless communication unit 102 (FIG. 1), controller 198 (FIG. 1), and/or to perform one or more operations of the method of FIG. 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless communication, the apparatus comprising a controller to control a plurality of transmit powers of a plurality of directional beams formed by an antenna array to transmit a wireless communication, the controller is to control the plurality of transmit powers based on at least first and second power limits, the first power limit including a power density limit corresponding to a power density of a directional beam of the plurality of directional beams, and the second power limit including a total transmit power limit corresponding to a total of the transmit powers.

Example 2 includes the subject matter of Example 1 and optionally, wherein the controller is to control the transmit powers based on throughputs of the directional beams achievable by the plurality of transmit powers.

Example 3 includes the subject matter of Example 2 and optionally, wherein the controller is to control the transmit powers based on a maximal combined throughput corresponding to the throughputs of the directional beams.

Example 4 includes the subject matter of any one of Examples 1-3 and optionally, wherein the power density of the directional beam is based on a transmit power of the directional beam and an antenna gain of the antenna array in a direction of the directional beam.

Example 5 includes the subject matter of any one of Examples 1-4 and optionally, wherein the power density limit relates to the power density at a predefined distance from the antenna array.

Example 6 includes the subject matter of Example 5 and optionally, wherein the controller is to determine the transmit powers according to the following criterion $$\frac{P_i G_i}{4\pi R^2} \le S_{max}$$

wherein $P_i$ denotes a transmit power of an i-th directional beam, $G_i$ denotes an antenna gain of the antenna array in a direction of the i-th directional beam, R denotes the predefined distance, and $S_{max}$ denotes the power density limit.

Example 7 includes the subject matter of Example 5 or 6 and optionally, wherein the predefined distance comprises a distance of three meters.

Example 8 includes the subject matter of any one of Examples 1-7 and optionally, wherein the controller is to determine the transmit powers according to the following criterion $$\sum_{i=1}^{N} P_i \le P_0 \le P\text{max}$$

wherein N denotes a number of the plurality of directional beams, $P_i$ denotes a transmit power of an i-th directional beam, $P_0$ denotes a maximal total transmit power of the antenna array, and $P_{max}$ denotes the total transmit power limit.

Example 9 includes the subject matter of any one of Examples 1-8 and optionally, wherein the controller is to control the plurality of transmit powers to generate each of the directional beams having a power density equal to or lesser than the power density limit.

Example 10 includes the subject matter of any one of Examples 1-9 and optionally, wherein the wireless communication comprises a beamformed diversity communication.

Example 11 includes the subject matter of any one of Examples 1-10 and optionally, wherein the wireless communication comprises a Multi-Input-Multi-Output (MIMO) communication.

Example 12 includes the subject matter of Example 11 and optionally, wherein the wireless communication comprises a Multi-User (MU) MIMO communication, and wherein the plurality of directional beams are directed to a plurality of users.

Example 13 includes the subject matter of Example 12 and optionally, wherein the controller is to select the plurality of users based on channel propagation losses of a plurality of channels corresponding to the plurality of users.

Example 14 includes the subject matter of Example 13 and optionally, wherein the controller is to select the plurality of users having channel propagation losses within a predefined channel propagation loss range.

Example 15 includes the subject matter of any one of Examples 12-14 and optionally, wherein the controller is to control the transmit powers based on throughputs to the plurality of users achievable by the plurality of transmit powers.

Example 16 includes the subject matter of Example 15 and optionally, wherein the controller is to control the transmit powers based on a maximal combined throughput corresponding to the throughputs to the users.

Example 17 includes the subject matter of any one of Examples 1-16 and optionally, wherein the antenna array comprises a plurality of antenna modules, each antenna module including a plurality of antenna elements coupled to a common Radio-Frequency (RF) chain.

Example 18 includes the subject matter of any one of Examples 1-17 and optionally, wherein the wireless communication comprises a communication over a millimeter-wave (mmWave) frequency band.

Example 19 includes a system of wireless communication, the system comprising a wireless communication device including an antenna array to generate a plurality of directional beams to transmit a wireless communication; a controller to control a plurality of transmit powers of the directional beams based on at least first and second power limits, the first power limit including a power density limit corresponding to a power density of a directional beam of the plurality of directional beams, and the second power limit including a total transmit power limit corresponding to a total of the transmit powers; and a processor to process information to be communicated as part of the wireless communication.

Example 20 includes the subject matter of Example 19 and optionally, wherein the controller is to control the transmit powers based on throughputs of the directional beams achievable by the plurality of transmit powers.

Example 21 includes the subject matter of Example 20 and optionally, wherein the controller is to control the transmit powers based on a maximal combined throughput corresponding to the throughputs of the directional beams.

Example 22 includes the subject matter of any one of Examples 19-21 and optionally, wherein the power density of the directional beam is based on a transmit power of the directional beam and an antenna gain of the antenna array in a direction of the directional beam.

Example 23 includes the subject matter of any one of Examples 19-22 and optionally, wherein the power density limit relates to the power density at a predefined distance from the antenna array.

Example 24 includes the subject matter of Example 23 and optionally, wherein the controller is to determine the transmit powers according to the following criterion $$\frac{P_i G_i}{4\pi R^2} \leq S_{max}$$

wherein $P_i$ denotes a transmit power of an i-th directional beam, $G_i$ denotes an antenna gain of the antenna array in a direction of the i-th directional beam, R denotes the predefined distance, and $S_{max}$ denotes the power density limit.

Example 25 includes the subject matter of Example 22 or 23 and optionally, wherein the predefined distance comprises a distance of three meters.

Example 26 includes the subject matter of any one of Examples 19-25 and optionally, wherein the controller is to determine the transmit powers according to the following criterion $$\sum_{i=1}^{N} P_i \leq P_0 \leq P\text{max}$$

wherein N denotes a number of the plurality of directional beams, $P_i$ denotes a transmit power of an i-th directional beam, $P_0$ denotes a maximal total transmit power of the antenna array, and $P_{max}$ denotes the total transmit power limit.

Example 27 includes the subject matter of any one of Examples 19-26 and optionally, wherein the controller is to control the plurality of transmit powers to generate each of the directional beams having a power density equal to or lesser than the power density limit.

Example 28 includes the subject matter of any one of Examples 19-27 and optionally, wherein the wireless communication comprises a beamformed diversity communication.

Example 29 includes the subject matter of any one of Examples 19-28 and optionally, wherein the wireless communication comprises a Multi-Input-Multi-Output (MIMO) communication.

Example 30 includes the subject matter of Example 29 and optionally, wherein the wireless communication comprises a Multi-User (MU) MIMO communication, and wherein the plurality of directional beams are directed to a plurality of users.

Example 31 includes the subject matter of Example 30 and optionally, wherein the controller is to select the plurality of users based on channel propagation losses of a plurality of channels corresponding to the plurality of users.

Example 32 includes the subject matter of Example 31 and optionally, wherein the controller is to select the plurality of users having channel propagation losses within a predefined channel propagation loss range.

Example 33 includes the subject matter of any one of Examples 30-32 and optionally, wherein the controller is to control the transmit powers based on throughputs to the plurality of users achievable by the plurality of transmit powers.

Example 34 includes the subject matter of Example 33 and optionally, wherein the controller is to control the transmit powers based on a maximal combined throughput corresponding to the throughputs to the users.

Example 35 includes the subject matter of any one of Examples 19-34 and optionally, wherein the antenna array comprises a plurality of antenna modules, each antenna module including a plurality of antenna elements coupled to a common Radio-Frequency (RF) chain.

Example 36 includes the subject matter of any one of Examples 19-35 and optionally, wherein the controller is to control the antenna array to communicate over a millimeter-wave (mmWave) frequency band.

Example 37 includes the subject matter of any one of Examples 19-36 and optionally, wherein the wireless communication device comprises an access point.

Example 38 includes a method of wireless communication, the method comprising controlling a plurality of transmit powers of a plurality of directional beams formed by an antenna array for transmitting a wireless communication, the controlling comprises controlling the transmit powers based on at least first and second power limits, the first power limit including a power density limit corresponding to a power density of a directional beam of the plurality of directional beams, and the second power limit including a total transmit power limit corresponding to a total of the transmit powers.

Example 39 includes the subject matter of Example 38 comprising controlling the transmit powers based on throughputs of the directional beams achievable by the plurality of transmit powers.

Example 40 includes the subject matter of Example 39 comprising controlling the transmit powers based on a maximal combined throughput corresponding to the throughputs of the directional beams.

Example 41 includes the subject matter of any one of Examples 38-40 and optionally, wherein the power density of the directional beam is based on a transmit power of the directional beam and an antenna gain of the antenna array in a direction of the directional beam.

Example 42 includes the subject matter of any one of Examples 38-41 and optionally, wherein the power density limit relates to the power density at a predefined distance from the antenna array.

Example 43 includes the subject matter of Example 42 comprising determining the transmit powers according to the following criterion $$\frac{P_i G_i}{4\pi R^2} \le S_{max}$$

wherein $P_i$ denotes a transmit power of an i-th directional beam, $G_i$ denotes an antenna gain of the antenna array in a direction of the i-th directional beam, R denotes the predefined distance, and $S_{max}$ denotes the power density limit.

Example 44 includes the subject matter of Example 42 or 43 and optionally, wherein the predefined distance comprises a distance of three meters.

Example 45 includes the subject matter of any one of Examples 38-44 comprising determining the transmit powers according to the following criterion $$\sum_{i=1}^{N} P_i \le P_0 \le P\text{max}$$

wherein N denotes a number of the plurality of directional beams, $P_i$ denotes a transmit power of an i-th directional beam, $P_0$ denotes a maximal total transmit power of the antenna array, and $P_{max}$ denotes the total transmit power limit.

Example 46 includes the subject matter of any one of Examples 38-45 comprising controlling the plurality of transmit powers to generate each of the directional beams having a power density equal to or lesser than the power density limit.

Example 47 includes the subject matter of any one of Examples 38-46 comprising transmitting a beamformed diversity communication.

Example 48 includes the subject matter of any one of Examples 38-47 comprising transmitting a Multi-Input-Multi-Output (MIMO) communication.

Example 49 includes the subject matter of Example 48 and optionally, wherein the wireless communication comprises a Multi-User (MU) MIMO communication, and wherein the plurality of directional beams are directed to a plurality of users.

Example 50 includes the subject matter of Example 49 comprising selecting the plurality of users based on channel propagation losses of a plurality of channels corresponding to the plurality of users.

Example 51 includes the subject matter of Example 50 comprising selecting the plurality of users having channel propagation losses within a predefined channel propagation loss range.

Example 52 includes the subject matter of any one of Examples 49-51 comprising controlling the transmit powers based on throughputs to the plurality of users achievable by the plurality of transmit powers.

Example 53 includes the subject matter of Example 52 comprising controlling the transmit powers based on a maximal combined throughput corresponding to the throughputs to the users.

Example 54 includes the subject matter of any one of Examples 38-53 and optionally, wherein the antenna array includes a plurality of antenna modules, each antenna module including a plurality of antenna elements coupled to a common Radio-Frequency (RF) chain.

Example 55 includes the subject matter of any one of Examples 38-54 comprising communicating over a millimeter-wave (mmWave) frequency band.

Example 56 includes a product including a non-transitory storage medium having stored thereon instructions that, when executed by a machine, result in controlling a plurality of transmit powers of a plurality of directional beams formed by an antenna array for transmitting a wireless communication, the controlling including controlling the plurality of transmit powers based on at least first and second power limits, the first power limit including a power density limit corresponding to a power density of a directional beam of the plurality of directional beams, and the second power limit including a total transmit power limit corresponding to a total of the transmit powers.

Example 57 includes the subject matter of Example 56 and optionally, wherein the instructions result in controlling the transmit powers based on throughputs of the directional beams achievable by the plurality of transmit powers.

Example 58 includes the subject matter of Example 57 and optionally, wherein the instructions result in controlling the transmit powers based on a maximal combined throughput corresponding to the throughputs of the directional beams.

Example 59 includes the subject matter of any one of Examples 56-57 and optionally, wherein the power density of the directional beam is based on a transmit power of the directional beam and an antenna gain of the antenna array in a direction of the directional beam.

Example 60 includes the subject matter of any one of Examples 56-59 and optionally, wherein the power density limit relates to the power density at a predefined distance from the antenna array.

Example 61 includes the subject matter of Example 60 and optionally, wherein the instructions result in determining the transmit powers according to the following criterion $$\frac{P_i G_i}{4\pi R^2} \leq S_{max}$$

wherein $P_i$ denotes a transmit power of an i-th directional beam, $G_i$ denotes an antenna gain of the antenna array in a direction of the i-th directional beam, R denotes the predefined distance, and $S_{max}$ denotes the power density limit.

Example 62 includes the subject matter of Example 60 or 61 and optionally, wherein the predefined distance comprises a distance of three meters.

Example 63 includes the subject matter of any one of Examples 56-62 and optionally, wherein the instructions result in determining the transmit powers according to the following criterion $$\sum_{i=1}^{N} P_i \leq P_0 \leq P\text{max}$$

wherein N denotes a number of the plurality of directional beams, $P_i$ denotes a transmit power of the directional beam, $P_0$ denotes a maximal total transmit power of the antenna array, and $P_{max}$ denotes the total transmit power limit.

Example 64 includes the subject matter of any one of Examples 56-63 and optionally, wherein the instructions result in controlling the plurality of transmit powers to generate each of the directional beams having a power density equal to or lesser than the power density limit.

Example 65 includes the subject matter of any one of Examples 56-64 and optionally, wherein the instructions result in transmitting a beamformed diversity communication.

Example 66 includes the subject matter of any one of Examples 56-65 and optionally, wherein the instructions result in transmitting a Multi-Input-Multi-Output (MIMO) communication.

Example 67 includes the subject matter of Example 66 and optionally, wherein the wireless communication comprises a Multi-User (MU) MIMO communication, and wherein the plurality of directional beams are directed to a plurality of users.

Example 68 includes the subject matter of Example 67 and optionally, wherein the instructions result in selecting the plurality of users based on channel propagation losses of a plurality of channels corresponding to the plurality of users.

Example 69 includes the subject matter of Example 68 and optionally, wherein the instructions result in selecting the plurality of users having channel propagation losses within a predefined channel propagation loss range.

Example 70 includes the subject matter of any one of Examples 67-69 and optionally, wherein the instructions result in controlling the transmit powers based on throughputs to the plurality of users achievable by the plurality of transmit powers.

Example 71 includes the subject matter of Example 70 and optionally, wherein the instructions result in controlling the transmit powers based on a maximal combined throughput corresponding to the throughputs to the users.

Example 72 includes the subject matter of any one of Examples 56-71 and optionally, wherein the antenna array includes a plurality of antenna modules, each antenna module including a plurality of antenna elements coupled to a common Radio-Frequency (RF) chain.

Example 73 includes the subject matter of any one of Examples 56-72 and optionally, wherein the instructions result in communicating over a millimeter-wave (mmWave) frequency band.

Example 74 includes an apparatus of wireless communication, the apparatus comprising means for controlling a plurality of transmit powers of a plurality of directional beams formed by an antenna array to transmit a wireless communication, the controlling including controlling the plurality of transmit powers based on at least first and second power limits, the first power limit including a power density limit corresponding to a power density of a directional beam of the plurality of directional beams, and the second power limit including a total transmit power limit corresponding to a total of the transmit powers.

Example 75 includes the subject matter of Example 74 comprising means for controlling the transmit powers based on throughputs of the directional beams achievable by the plurality of transmit powers.

Example 76 includes the subject matter of Example 75 comprising means for controlling the transmit powers based on a maximal combined throughput corresponding to the throughputs of the directional beams.

Example 77 includes the subject matter of any one of Examples 74-76 and optionally, wherein the power density of the directional beam is based on a transmit power of the directional beam and an antenna gain of the antenna array in a direction of the directional beam.

Example 78 includes the subject matter of any one of Examples 74-77 and optionally, wherein the power density limit relates to the power density at a predefined distance from the antenna array.

Example 79 includes the subject matter of Example 78 comprising means for determining the transmit powers according to the following criterion $$\frac{P_i G_i}{4\pi R^2} \leq S_{max}$$

wherein $P_i$ denotes a transmit power of an i-th directional beam, $G_i$ denotes an antenna gain of the antenna array in a direction of the i-th directional beam, R denotes the predefined distance, and $S_{max}$ denotes the power density limit.

Example 80 includes the subject matter of Example 78 or 79 and optionally, wherein the predefined distance comprises a distance of three meters.

Example 81 includes the subject matter of any one of Examples 74-80 comprising means for determining the transmit powers according to the following criterion $$\sum_{i=1}^{N} P_i \leq P_0 \leq P\text{max}$$

wherein N denotes a number of the plurality of directional beams, $P_i$ denotes a transmit power of an i-th directional beam, $P_0$ denotes a maximal total transmit power of the antenna array, and $P_{max}$ denotes the total transmit power limit.

Example 82 includes the subject matter of any one of Examples 74-81 comprising means for controlling the plurality of transmit powers to generate each of the directional beams having a power density equal to or lesser than the power density limit.

Example 83 includes the subject matter of any one of Examples 74-82 comprising means for transmitting a beamformed diversity communication.

Example 84 includes the subject matter of any one of Examples 74-83 comprising means for transmitting a Multi-Input-Multi-Output (MIMO) communication.

Example 85 includes the subject matter of Example 84 and optionally, wherein the wireless communication comprises a Multi-User (MU) MIMO communication, and wherein the plurality of directional beams are directed to a plurality of users.

Example 86 includes the subject matter of Example 85 comprising means for selecting the plurality of users based on channel propagation losses of a plurality of channels corresponding to the plurality of users.

Example 87 includes the subject matter of Example 86 comprising means for selecting the plurality of users having channel propagation losses within a predefined channel propagation loss range.

Example 88 includes the subject matter of any one of Examples 85-87 comprising means for controlling the transmit powers based on throughputs to the plurality of users achievable by the plurality of transmit powers.

Example 89 includes the subject matter of Example 88 comprising means for controlling the transmit powers based on a maximal combined throughput corresponding to the throughputs to the users.

Example 90 includes the subject matter of any one of Examples 74-89 and optionally, wherein the antenna array includes a plurality if antenna modules, each antenna module including a plurality of antenna elements coupled to a common Radio-Frequency (RF) chain.

Example 91 includes the subject matter of any one of Examples 74-90 comprising means for communicating over a millimeter-wave (mmWave) frequency band.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
   a beamforming processor configured to perform beamforming processing of a wireless transmission via a plurality of directional beams to be formed by an antenna array; and
   a transmit power controller configured to control a plurality of transmit powers of the plurality of directional beams based at least on the following criteria:

$$\frac{P_i G_i}{4\pi R^2} \leq S_{max}$$

$$\sum_{i=1}^{N} P_i \leq P_0 \leq P\text{max}$$

wherein $P_i$ denotes a transmit power of an i-th directional beam of said plurality of directional beams, $G_i$ denotes an antenna gain of the antenna array in a direction of the i-th directional beam, R denotes a predefined distance from said antenna array, $S_{max}$ denotes a power density limit, N denotes a number of said plurality of directional beams, $P_0$ denotes a maximal total transmit power of said antenna array, and $P_{max}$ denotes a total transmit power limit.

2. The apparatus of claim 1, wherein $S_{max}$ is 18 microwatt to square centimeter ($\mu W/cm^2$).

3. The apparatus of claim 1, wherein $P_{max}$ is 500 miliwatt (mW).

4. The apparatus of claim 1, wherein R is 3 meter.

5. The apparatus of claim 1, wherein said wireless transmission comprises a beamformed diversity transmission.

6. The apparatus of claim 1, wherein said wireless transmission comprises a Multi-Input-Multi-Output (MIMO) transmission.

7. The apparatus of claim 6, wherein said wireless transmission comprises a Multi-User (MU) MIMO transmission, said plurality of directional beams to be directed to a plurality of users.

8. The apparatus of claim 7, wherein said transmit power controller is configured to select said plurality of users based on at least one predefined parameter.

9. The apparatus of claim 7, wherein said transmit power controller is configured to select said plurality of users based at least on channel propagation losses of a plurality of channels corresponding to said plurality of users.

10. The apparatus of claim 1 comprising said antenna array.

11. The apparatus of claim 10, wherein the antenna array comprises a plurality of antenna modules, an antenna module of said plurality of antenna modules comprising a plurality of antenna elements coupled to a Radio-Frequency (RF) chain.

12. The apparatus of claim 1 comprising a baseband processor, the baseband processor comprising the beamforming processor and the transmit power controller.

13. The apparatus of claim 1, wherein said wireless transmission comprises a transmission over a millimeter-wave (mmWave) frequency band.

14. The apparatus of claim 1 being an access point.

15. The apparatus of claim 1 comprising a memory, and a network interface.

16. A product comprising a non-transitory storage medium having stored thereon instructions that, when executed by a machine, result in:
   determining a plurality of transmit powers of a plurality of directional beams to be formed by an antenna array based at least on the following criteria:

$$\frac{P_i G_i}{4\pi R^2} \leq S_{max}$$

$$\sum_{i=1}^{N} P_i \leq P_0 \leq P\text{max}$$

wherein $P_i$ denotes a transmit power of an i-th directional beam of said plurality of directional beams, $G_i$ denotes an antenna gain of the antenna array in a direction of the i-th directional beam, R denotes a predefined distance from said antenna array, $S_{max}$ denotes a power density limit, N denotes a number of said plurality of directional beams, $P_0$ denotes a maximal total transmit power of said antenna array, and $P_{max}$ denotes a total transmit power limit; and providing to a beamforming processor a plurality of values based on the plurality of transmit powers.

17. The product of claim 16, wherein said plurality of values comprises a plurality of beamforming power weights.

18. The product of claim 16, wherein $S_{max}$ is 18 microwatt to square centimeter ($\mu W/cm^2$).

19. The product of claim 16, wherein $P_{max}$ is 500 miliwatt (mW).

20. The product of claim 16, wherein R is 3 meter.

21. The product of claim 16, wherein said plurality of directional beams comprises beams of a beamformed diversity transmission.

22. The product of claim 16, wherein said plurality of directional beams comprises beams of a Multi-Input-Multi-Output (MIMO) transmission.

23. The product of claim 22, wherein said MIMO transmission comprises a Multi-User (MU) MIMO transmission, said plurality of directional beams to be directed to a plurality of users.

24. The product of claim 16, wherein said plurality of directional beams comprises beams of a wireless transmission over a millimeter-wave (mmWave) frequency band.

\* \* \* \* \*